(12) United States Patent
Yokozawa et al.

(10) Patent No.: US 10,889,127 B2
(45) Date of Patent: Jan. 12, 2021

(54) LIQUID DISCHARGE APPARATUS, DEFECTIVE NOZZLE DETECTION METHOD, AND RECORDING MEDIUM

(71) Applicants: Suguru Yokozawa, Kanagawa (JP); Takayuki Ito, Kanagawa (JP); Nobuyuki Satoh, Kanagawa (JP); Kohtaroh Ikegami, Kanagawa (JP); Kenta Sasaki, Kanagawa (JP)

(72) Inventors: Suguru Yokozawa, Kanagawa (JP); Takayuki Ito, Kanagawa (JP); Nobuyuki Satoh, Kanagawa (JP); Kohtaroh Ikegami, Kanagawa (JP); Kenta Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/294,510

(22) Filed: Mar. 6, 2019

(65) Prior Publication Data

US 2019/0283447 A1 Sep. 19, 2019

(30) Foreign Application Priority Data

Mar. 19, 2018 (JP) .................................. 2018-051813
Jan. 24, 2019 (JP) .................................. 2019-010685

(51) Int. Cl.
*B41J 29/38* (2006.01)
*B41J 2/21* (2006.01)
(Continued)

(52) U.S. Cl.
CPC ............... *B41J 2/2142* (2013.01); *B41J 2/15* (2013.01); *B41J 2/16579* (2013.01);
(Continued)

(58) Field of Classification Search
CPC ............................. B41J 29/393; B41J 2/2142
See application file for complete search history.

(56) References Cited

U.S. PATENT DOCUMENTS 8,066,348 B2 * 11/2011 Hirota .................... B41J 2/2142
347/14
2009/0179934 A1 7/2009 Takagi et al.
(Continued)

FOREIGN PATENT DOCUMENTS

JP 2014-157026 8/2014
JP 2016-026918 2/2016
(Continued)

*Primary Examiner* — Lam S Nguyen
(74) *Attorney, Agent, or Firm* — Duft & Bornsen, PC

(57) ABSTRACT

A liquid discharge apparatus includes a liquid discharge head having at least one nozzle array including a plurality of nozzles lined in a nozzle array direction; a two-dimensional image sensor to capture an image formed by the liquid discharge head; and circuitry. The circuitry is configured to divide the nozzles into a plurality of nozzle units; form a pattern including a plurality of unit patterns with liquid discharged from the nozzle units, respectively; and detect a defective nozzle based on a captured image of each of the unit patterns. The unit patterns are arranged in a staggered manner. Each unit pattern is smaller in size than an image capture range of the two-dimensional image sensor. Each unit pattern includes a number of columns of lines extending in a direction perpendicular to the nozzle array direction, and the number of columns is not smaller than twice the number of nozzle arrays.

20 Claims, 23 Drawing Sheets

(51) Int. Cl.
*G06T 7/00* (2017.01)
*B41J 29/393* (2006.01)
*B41J 2/15* (2006.01)
*B41J 2/165* (2006.01)

(52) U.S. Cl.
CPC ........... *B41J 29/393* (2013.01); *G06T 7/0004* (2013.01); *B41J 2029/3935* (2013.01); *G06T 2207/30144* (2013.01)

(56) References Cited

U.S. PATENT DOCUMENTS

| | | |
|---|---|---|
| 2009/0316164 A1 | 12/2009 | Takahashi et al. |
| 2010/0225693 A1 | 9/2010 | Sakurada et al. |
| 2010/0231632 A1 | 9/2010 | Kobayashi et al. |
| 2011/0007112 A1 | 1/2011 | Takei et al. |
| 2011/0063352 A1 | 3/2011 | Sakurada et al. |
| 2011/0063356 A1 | 3/2011 | Kobayashi et al. |
| 2011/0102489 A1 | 5/2011 | Sakakibara et al. |
| 2011/0141175 A1* | 6/2011 | Murray ............. B41J 11/0095 347/14 |
| 2011/0148971 A1 | 6/2011 | Suzuki et al. |
| 2011/0205275 A1 | 8/2011 | Kimura et al. |
| 2012/0062643 A1 | 3/2012 | Ito |
| 2012/0069411 A1 | 3/2012 | Satoh et al. |
| 2012/0147078 A1 | 6/2012 | Takagi et al. |
| 2014/0218754 A1 | 8/2014 | Satoh et al. |
| 2015/0158309 A1 | 6/2015 | Fujii et al. |
| 2015/0375498 A1 | 12/2015 | Horikawa et al. |
| 2016/0004202 A1 | 1/2016 | Morita et al. |
| 2016/0031250 A1 | 2/2016 | Yokozawa et al. |
| 2016/0171348 A1 | 6/2016 | Satoh et al. |
| 2016/0243866 A1 | 8/2016 | Yokozawa et al. |
| 2016/0347052 A1 | 12/2016 | Kawarada et al. |
| 2017/0272617 A1 | 9/2017 | Satoh et al. |
| 2017/0361605 A1 | 12/2017 | Kawarada et al. |
| 2018/0141329 A1 | 5/2018 | Aoyagi et al. |
| 2018/0141359 A1 | 5/2018 | Kawarada et al. |
| 2018/0147835 A1 | 5/2018 | Nakamura et al. |

FOREIGN PATENT DOCUMENTS

| | | |
|---|---|---|
| JP | 2016-060066 | 4/2016 |
| JP | 2017-047613 | 3/2017 |
| JP | 2017-149150 | 8/2017 |

* cited by examiner

| 125 | 127 | 126 | 128 | 121 | 123 | 122 | 124 |
| 117 | 119 | 118 | 120 | 113 | 115 | 114 | 116 |
| 109 | 111 | 110 | 112 | 105 | 107 | 106 | 108 |
| 101 | 103 | 102 | 104 | 97 | 99 | 98 | 100 |
| 93 | 95 | 94 | 96 | 89 | 91 | 90 | 92 |
| 85 | 87 | 86 | 88 | 81 | 83 | 82 | 84 |
| 77 | 79 | 78 | 80 | 73 | 75 | 74 | 76 |
| 69 | 71 | 70 | 72 | 65 | 67 | 66 | 68 |
| 61 | 63 | 62 | 64 | 57 | 59 | 58 | 60 |
| 53 | 55 | 54 | 56 | 49 | 51 | 50 | 52 |
| 45 | 47 | 46 | 48 | 41 | 43 | 42 | 44 |
| 37 | 39 | 38 | 40 | 33 | 35 | 34 | 36 |
| 29 | 31 | 30 | 32 | 25 | 27 | 26 | 28 |
| 21 | 23 | 22 | 24 | 17 | 19 | 18 | 20 |
| 13 | 15 | 14 | 16 | 9 | 11 | 10 | 12 |
| 5 | 7 | 6 | 8 | 1 | 3 | 2 | 4 |

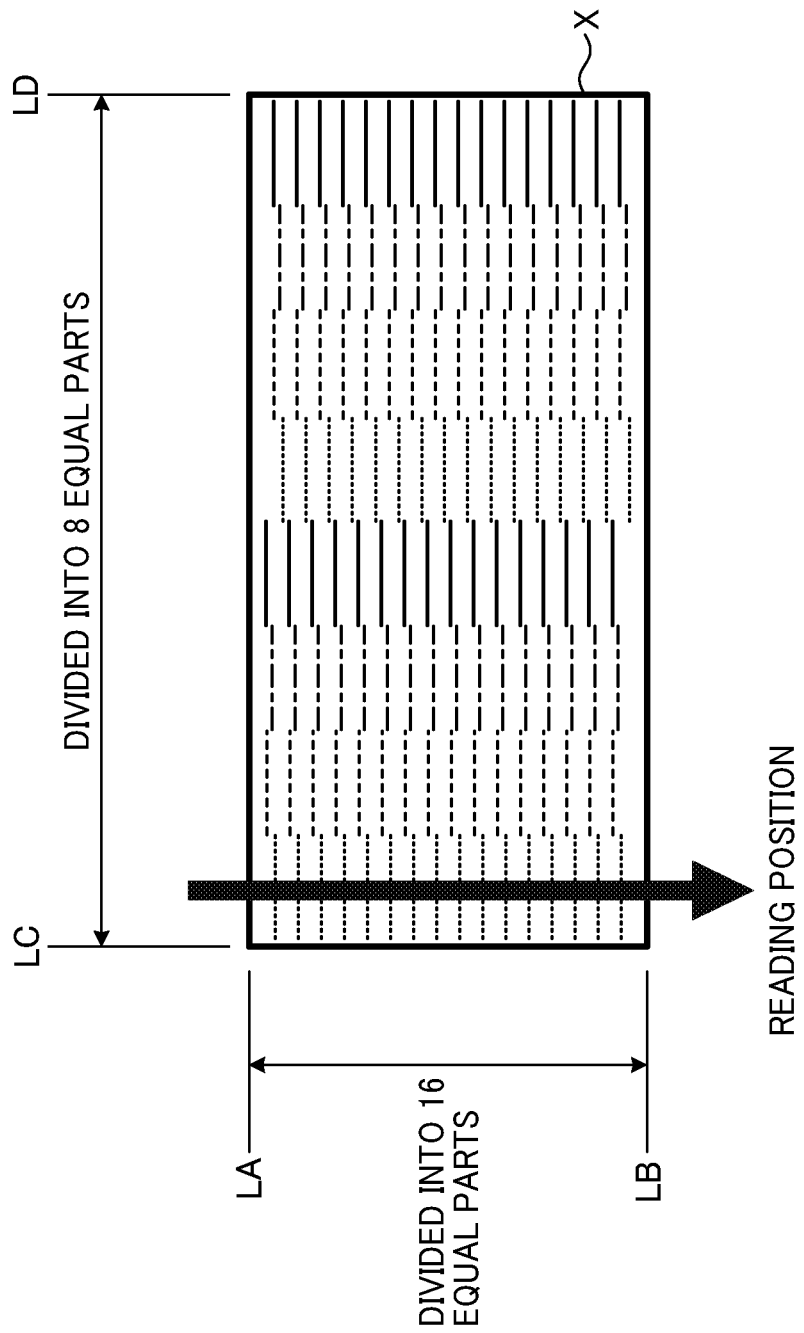

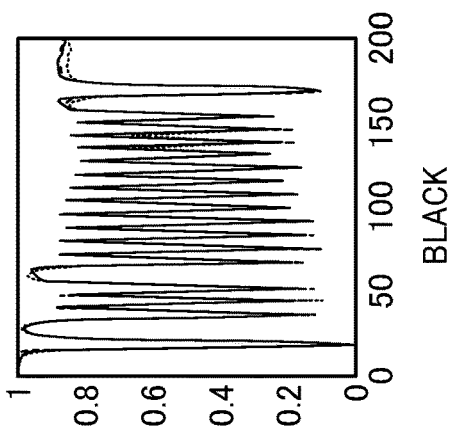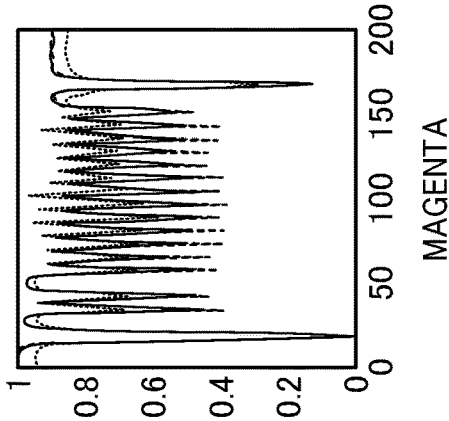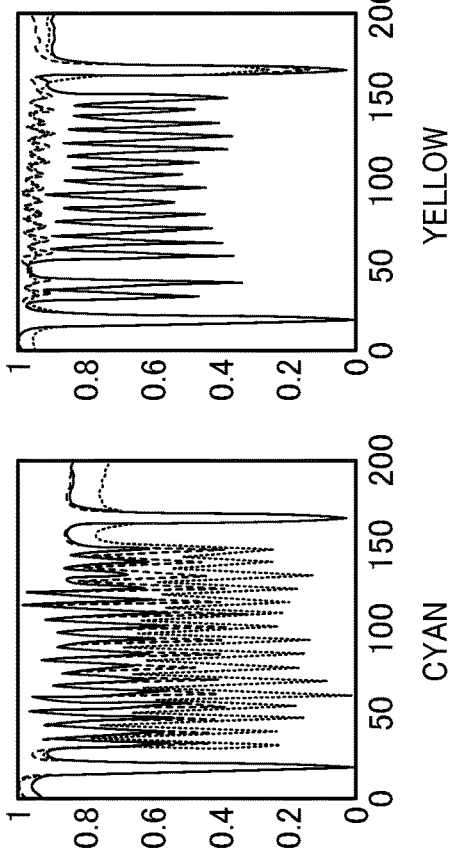

CYAN

YELLOW

MAGENTA

BLACK

LIGHT SOURCE: VISIBLE LIGHT

LIGHT SOURCE: ULTRAVIOLET LIGHT

LIGHT SOURCE: ULTRAVIOLET LIGHT
(RGB VALUED CORRECTED)

LIQUID DISCHARGE APPARATUS, DEFECTIVE NOZZLE DETECTION METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-051813, filed on Mar. 19, 2018, and 2019-010685, filed on Jan. 24, 2019, in the Japan Patent Office, the entire disclosure of each of which is hereby incorporated by reference herein.

BACKGROUND

Technical Field

The present disclosure relates to a liquid discharge apparatus and a method for detecting a defective nozzle, and a recording medium.

Description of the Related Art

There are technologies of inspecting a recorded image with a one-dimensional line sensor or a two-dimensional image sensor.

SUMMARY

An embodiment of this disclosure provides a liquid discharge apparatus that includes a liquid discharge head having at least one nozzle array including a plurality of nozzles lined in a nozzle array direction. The liquid discharge apparatus further includes a two-dimensional image sensor to capture an image formed by the liquid discharge head; and circuitry. The circuitry is configured to divide the plurality of nozzles into a plurality of nozzle units and form a pattern including a plurality of unit patterns with liquid discharged from the plurality of nozzle units, respectively. The plurality of unit patterns is arranged in a staggered manner, and each unit pattern is smaller in size than an image capture range of the two-dimensional image sensor. Each unit pattern includes a number of columns of lines, and the lines extend in a direction perpendicular to the nozzle array direction. The number of columns is not smaller than twice the number of nozzle arrays. The circuitry is further configured to detect, in the plurality of nozzles, a defective nozzle based on a captured image of each of the plurality of unit patterns.

Another embodiment provides a method for detecting a defective nozzle in a liquid discharge head having at least one nozzle array including a plurality of nozzles lined in a nozzle array direction. The method includes dividing the plurality of nozzles into a plurality of nozzle units; forming a pattern including a plurality of unit patterns with liquid discharged from the plurality of nozzle units, respectively; and arranging the plurality of unit patterns in a staggered manner. Each unit pattern is smaller in size than an image capture range of a two-dimensional image sensor. Each unit pattern includes a number of columns of lines, and the lines extend in a direction perpendicular to the nozzle array direction. The number of columns is not smaller than twice the number of nozzle arrays. The method further includes capturing an image of each of the plurality of unit patterns, with the two-dimensional image sensor; and detecting, in the plurality of nozzles, the defective nozzle based on the captured image of each of the plurality of unit patterns.

Another embodiment provides a non-transitory recording medium storing a plurality of program codes which, when executed by one or more processors, causes the processors to perform the method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 13 is a diagram illustrating a method of detecting the nozzle position according to an embodiment;

FIGS. 14A to 14D are graphs illustrating plot examples of values read by the two-dimensional image sensor;

Figure 1:
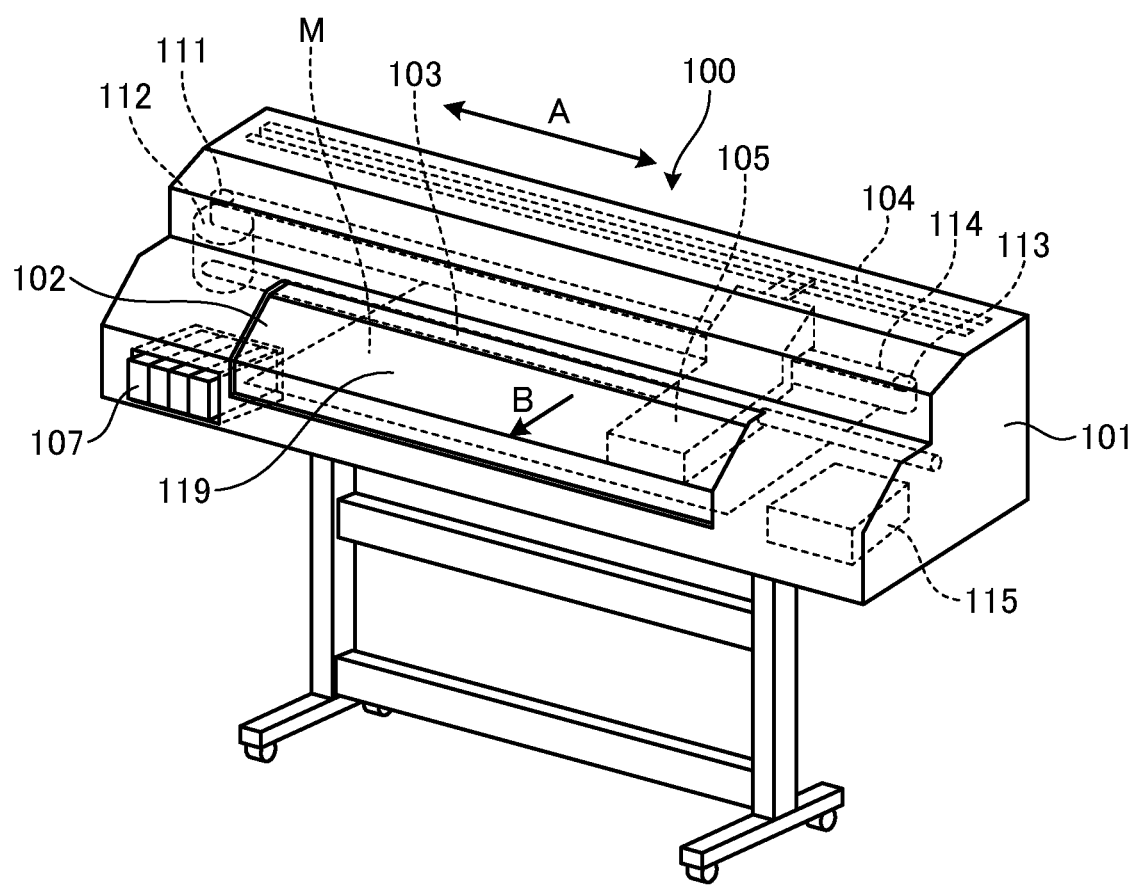
FIG. 1 is a perspective view illustrating an example of an inkjet recording apparatus according to Embodiment 1.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, liquid discharge apparatuses and discharge defect detecting methods according to embodiments of this disclosure is described. As used herein, the singular forms "a", "an", and "the" are intended to include the plural forms as well, unless the context clearly indicates otherwise.

The suffixes Y, M, C, and K attached to each reference numeral indicate only that components indicated thereby are used for forming yellow, magenta, cyan, and black images, respectively, and hereinafter may be omitted when color discrimination is not necessary.

The description below concerns an example where the liquid discharge apparatus is an inkjet recording apparatus that discharges liquid, but embodiments of the present disclosure are not limited thereto.

Embodiment 1

A hardware configuration of an inkjet recording apparatus is described below.

Figure 2:
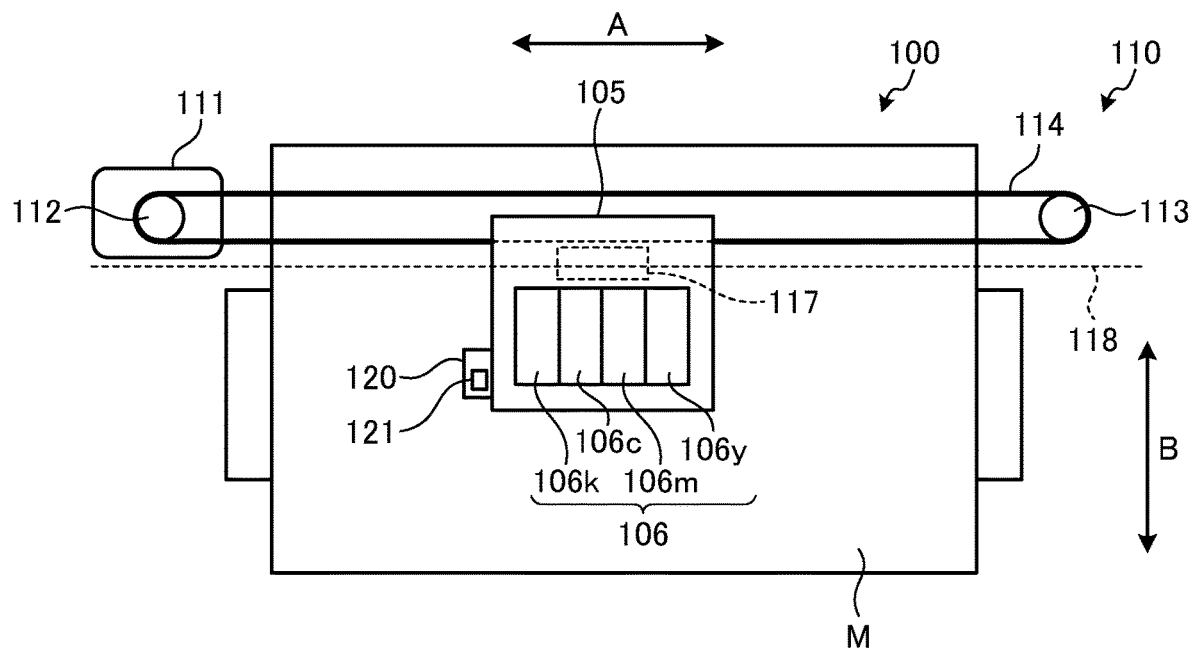
FIG. 2 is a plan view illustrating an example of a carriage and a main scanning mechanism of the inkjet recording apparatus illustrated in FIG. 1.

FIG. 1 is a perspective view illustrating an example configuration of an inkjet recording apparatus 100 according to Embodiment 1, and FIG. 2 is a plan view illustrating an example configuration of a carriage 105 and a main scanning mechanism 110. As illustrated in FIG. 1, the inkjet recording apparatus 100 includes an apparatus body 101 and a support stand 102. The inkjet recording apparatus 100 includes a guide rod 103 and a guide rail 104 supported on both side plates inside the apparatus body 101. The guide rod 103 and the guide rail 104 support the carriage 105 to be slidably in the direction indicated by arrow A. In addition, the inkjet recording apparatus 100 includes an ink cartridge 107.

As illustrated in FIG. 2, a recording head 106 constructed of liquid discharge heads 106k, 106c, 106m, and 106y are mounted on the carriage 105. The liquid discharge heads 106k, 106c, 106m, and 106y discharge ink droplets of different colors supplied from the ink cartridge 107. The recording head 106 and the carriage 105 together serve a liquid discharge device (or unit). The liquid discharge heads 106k, 106c, 106m, and 106y of the recording head 106 correspond to black (K), cyan (C), magenta (M), and yellow (Y) inks, respectively. The liquid discharge heads 106k, 106c, 106m, and 106y have a plurality of nozzles (see FIG. 3) and selectively discharge ink as droplets from the nozzles to form an image. Each of the liquid discharge heads 106k, 106c, 106m, and 106y of the recording head 106 is combined with a sub tank that stores the ink supplied from the ink cartridge 107.

Figure 3:
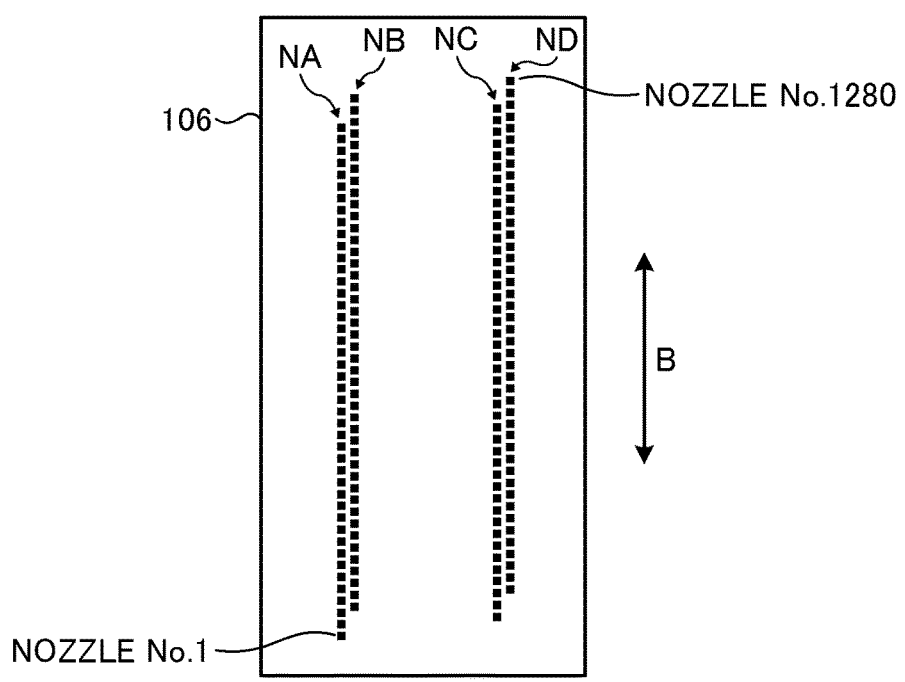
FIG. 3 is a plan view illustrating a configuration of a recording head of the inkjet recording apparatus illustrated in FIG. 1.

FIG. 3 is a plan view illustrating a configuration of the recording head 106. Each of the liquid discharge heads 106k, 106c, 106m, and 106y illustrated in FIG. 3 has four nozzle arrays (arrays NA, NB, NC, and ND in FIG. 3). There are, for example, 320 nozzles per array. One liquid discharge head 106 (106k, 106c, 106m, or 106y) has 1280 nozzles in total of four nozzle arrays. Thus, the inkjet recording apparatus 100 includes four One liquid discharge heads 106 each having 1280 nozzles.

Figure 4:
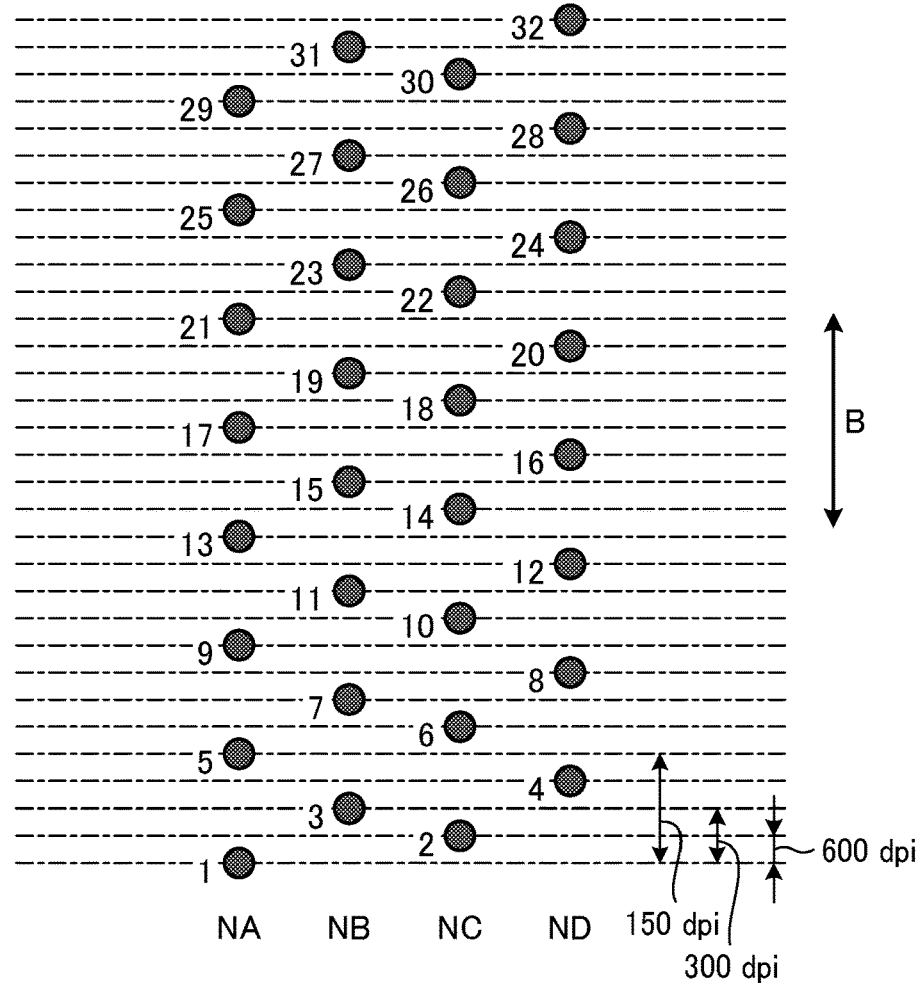
FIG. 4 is a schematic view of a nozzle plate face of the recording head illustrated in FIG. 3.

FIG. 4 schematically illustrates a face of a nozzle plate of the recording head 106 in which the nozzles are formed (i.e., a nozzle plate face). In the example illustrated in FIG. 4, the nozzles are arranged at intervals of 150 dpi in each nozzle array of the recording head 106. In addition, in the recording head 106, the nozzle arrays are shifted by 600 dpi in a sub-scanning direction indicated by arrow B (hereinafter "sub-scanning direction B") from each other. That is, in the nozzle arrays of the recording head 106, the nozzles are arranged so that the droplets discharged therefrom do not overlap in one scanning of the carriage 105 in the main scanning direction A. Accordingly, in the case of solid printing, an image of 600 dpi is formed in one scanning.

The nozzles of the recording head 106 sometimes fail to discharge ink properly. Therefore, the inkjet recording apparatus 100 is configured to determine which of the nozzles of the recording head 106 is defective in discharging ink (hereinafter "defective nozzle") and supplement an image formed by the defective nozzle, for example, with another head.

The main scanning mechanism 110 to move the carriage 105 for scanning includes a main scanning motor 111 disposed one side in the main scanning direction A, a driving pulley 112 rotated by the main scanning motor 111, a driven pulley 113 disposed on the other side in the main scanning direction A, and a belt 114 looped between the drive pulley 112 and the driven pulley 113. The driven pulley 113 is externally tensioned by a tension spring (in a direction departing from the driving pulley 112).

A portion of the belt 114 is fixed to and held by a belt securing portion on the back side of the carriage 105 to draw the carriage 105 in the main scanning direction A. In the inkjet recording apparatus 100, an end of a sheet M that is a sheet-like material to be conveyed is inserted into a sheet feeding port 119. In a recording area inside a scanning range of the carriage 105 in the main scanning direction A, the sheet M is conveyed intermittently in the sub-scanning direction B (also referred to as "sheet conveyance direction") perpendicular to the main scanning direction A in which the carriage 105 moves. In the present embodiment, the sheet M to be conveyed is rolled paper.

As illustrated in FIG. 1, the inkjet recording apparatus 100 further includes a maintenance mechanism 115 that performs maintenance of the recording head 106 mounted on the carriage 105.

Further, as illustrated in FIG. 2, the inkjet recording apparatus 100 includes a main-scanning encoder sensor 117 disposed in the carriage 105 and an encoder sheet 118 spread between the both side plates. The inkjet recording apparatus 100 moves the carriage 105 while continuously reading the encoder sheet 118 with the main-scanning encoder sensor 117 to detect the position in the main scanning direction A.

Figure 5:
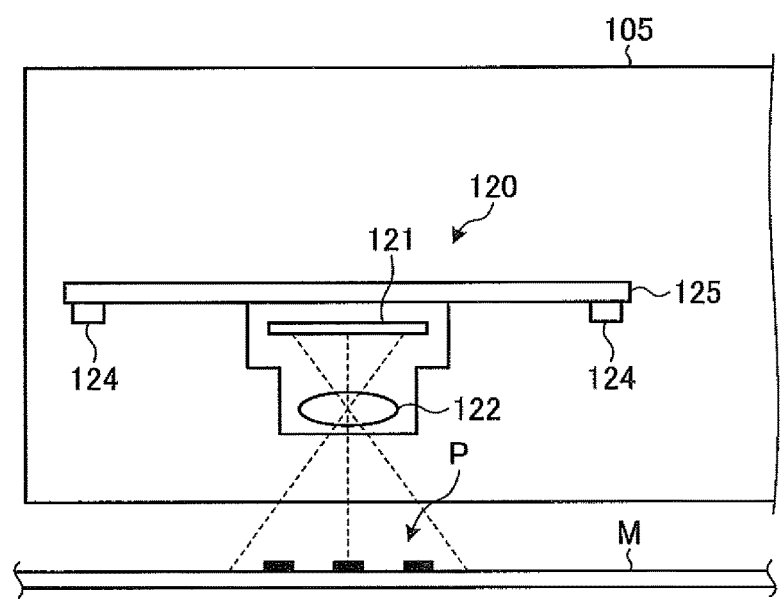
FIG. 5 is a cross-sectional view illustrating a configuration of an imaging unit according to one embodiment.

In addition, as illustrated in FIG. 2, the inkjet recording apparatus 100 includes an imaging unit 120 on the carriage 105. FIG. 5 is a cross-sectional view illustrating a configuration of the imaging unit 120. As illustrated in FIG. 5, the imaging unit 120 captures an image of a test pattern P formed on the sheet M. The imaging unit 120 includes a two-dimensional (2-D) image sensor 121, an image forming lens 122, white light emitting diode (LED) light sources 124 that emits visible light, and a board 125 on which the 2-D image sensor 121 and the LED light source 124 are mounted. The LED light sources 124 irradiates the test pattern P formed on the sheet M with light. The 2-D image sensor 121 is, for example, a charge-coupled device (CCD) sensor or a complementary metal oxide semiconductor (CMOS) sensor. The image forming lens 122 forms an optical image of the test pattern P on the sheet M on the light-receiving face of the 2-D image sensor 121. The LED light sources 124 are disposed on the board 125 symmetrically with respect to the 2-D image sensor 121. With such a configuration, the imaging unit 120 converts, with the 2-D image sensor 121, the light received through the image forming lens 122 to an electric signal and outputs the electric signal as a captured image of the test pattern P.

Next, a control system of the inkjet recording apparatus 100 will be described.

Figure 6:
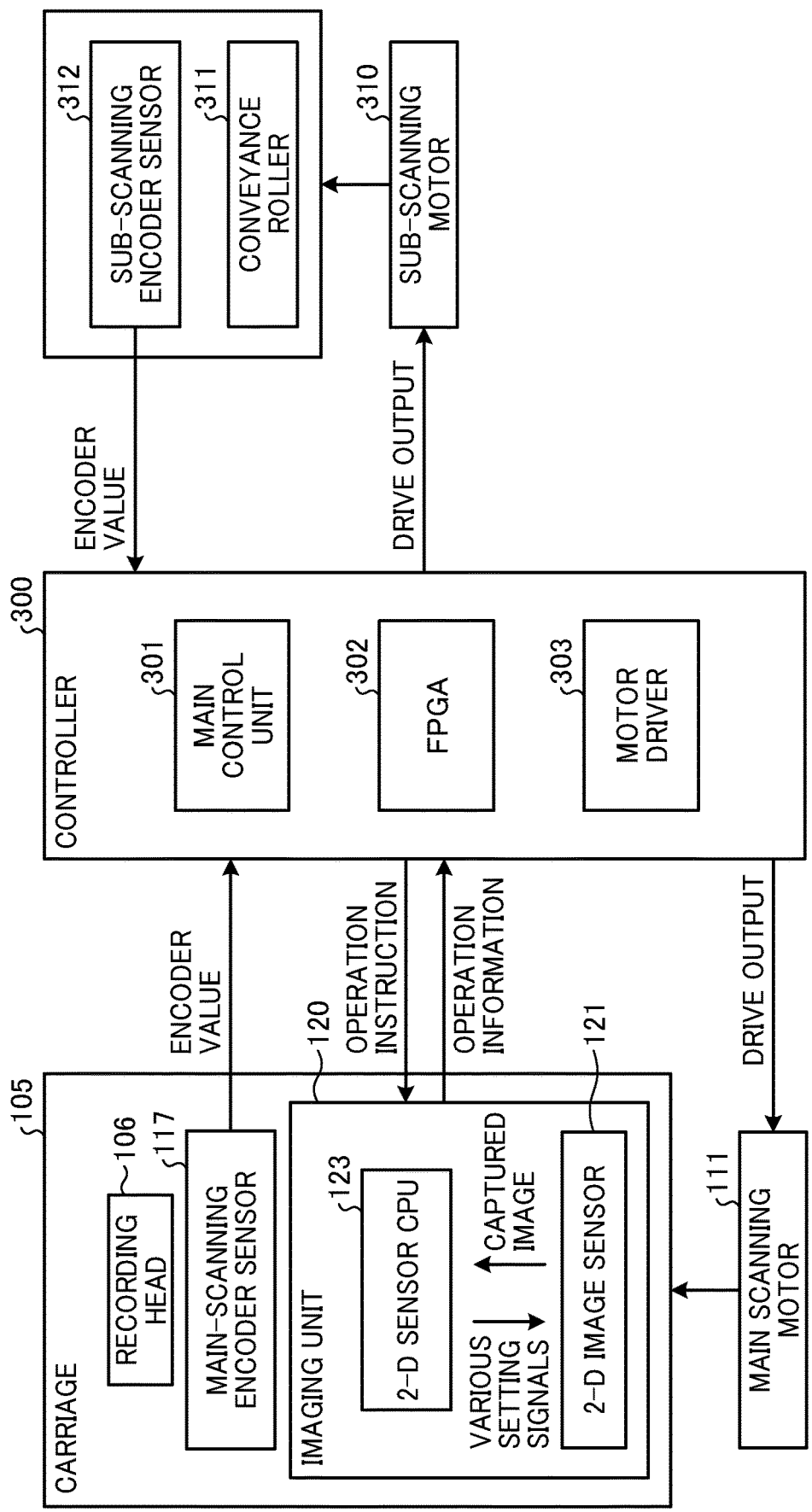
FIG. 6 is a block diagram illustrating electrical connections of a control system of the inkjet recording apparatus illustrated in FIG. 1.

FIG. 6 is a block diagram illustrating electrical connections of the control system of the inkjet recording apparatus 100. As illustrated in FIG. 6, the inkjet recording apparatus 100 includes a controller 300, which exercise main control of each unit. The controller 300 includes a main control unit 301, a field-programmable gate array (FPGA) 302, and a motor driver 303.

The main control unit 301 includes a microcomputer constructed of a CPU that governs the control of the entire inkjet recording apparatus 100, a read only memory (ROM), a random access memory (RAM), an interface (I/F), a timer, etc.

The ROM of the main control unit 301 stores various programs executed by the CPU and various data. The RAM of the main control unit 301 temporarily stores data and programs when the CPU executes various programs. The CPU of the main control unit 301 expands the program stored in the ROM to the RAM and executes the program, to comprehensively control each unit of the inkjet recording apparatus 100. At this time, the CPU communicates with and cooperates with the FPGA 302, to control various operations in the inkjet recording apparatus 100. For example, the main control unit 301 has functions of CPU control, memory control, ink discharge control, sensor control, motor control, and the like.

Computer programs executed in the inkjet recording apparatus 100 according to embodiments of the present disclosure can be stored, in a file format installable into a computer or executable by the computer, in a computer readable recording medium, such as a compact disc read only memory (CD-ROM), a flexible disk (FD), a compact disc recordable (CD-R), and a digital versatile disk (DVD).

Alternatively, the computer programs executed in the inkjet recording apparatus 100 according to embodiments of the present disclosure can be stored in a computer connected to a network such as the Internet and downloaded through the network. Alternatively, the computer programs executed in the inkjet recording apparatus 100 according to embodiments of the present disclosure can be supplied or distributed via a network such as the Internet.

The main control unit 301 controls driving of the recording head 106. The main control unit 301 drives, via the motor driver 303, the main scanning motor 111 and a sub-scanning motor 310. The sub-scanning motor 310 drives a conveyance roller 311 to convey the sheet M.

In addition to the main-scanning encoder sensor 117 of the carriage 105, the main control unit 301 is connected to a sub-scanning encoder sensor 312 that detects the sheet M in the sub-scanning direction B. The main control unit 301 receives encoder values from the main-scanning encoder sensor 117 and the sub-scanning encoder sensor 312, respectively.

In addition, the main control unit 301 is connected to the imaging unit 120. The main control unit 301 issues an imaging instruction to the imaging unit 120. The imaging unit 120 is provided with a CPU for the two-dimensional image sensor (hereinafter "2-D sensor CPU 123"), and the 2-D sensor CPU 123 performs imaging with the 2-D image sensor 121, according to the instruction from the main control unit 301, and executes various processes based on the imaging data. The 2-D sensor CPU 123 transmits operation information obtained by various processes to the main control unit 301.

Next, descriptions are given below of the functions implemented by the CPU of the main control unit 301 of the inkjet recording apparatus 100 executing the program stored in the ROM and the function implemented by the 2-D sensor CPU 123 executing the program. In the following, descriptions of conventional functions are omitted, and characteristic functions exerted by the inkjet recording apparatus 100 according to the present embodiment will be described in detail.

Figure 7:
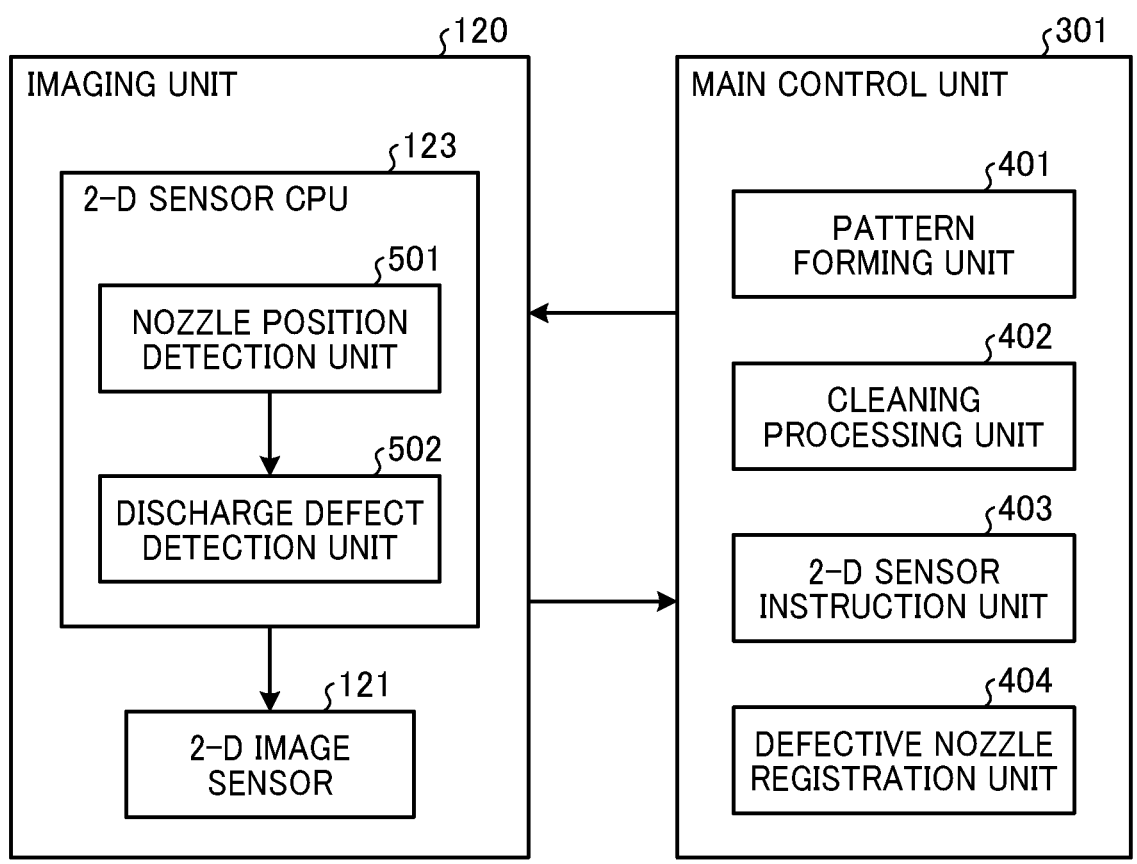
FIG. 7 is a block diagram illustrating functions exercised by a main control unit and functions performed by a central processing unit (CPU) for a two-dimensional image sensor in the control system illustrated I FIG. 6.

FIG. 7 is a block diagram illustrating functions implemented by the main control unit 301 and functions implemented by the 2-D sensor CPU 123.

As illustrated in FIG. 7, as the main control unit 301 executes the program stored in the ROM, the main control unit 301 functions as a pattern forming unit 401, a cleaning processing unit 402, a 2-D sensor instruction unit 403, and a defective nozzle registration unit 404.

As illustrated in FIG. 7, the 2-D sensor CPU 123 executing the program functions as a nozzle position detection unit 501 and a discharge defect detection unit 502.

The pattern forming unit 401 controls driving of the recording head 106 and the main scanning mechanism 110 to form the test pattern P on the sheet M.

Figure 8:
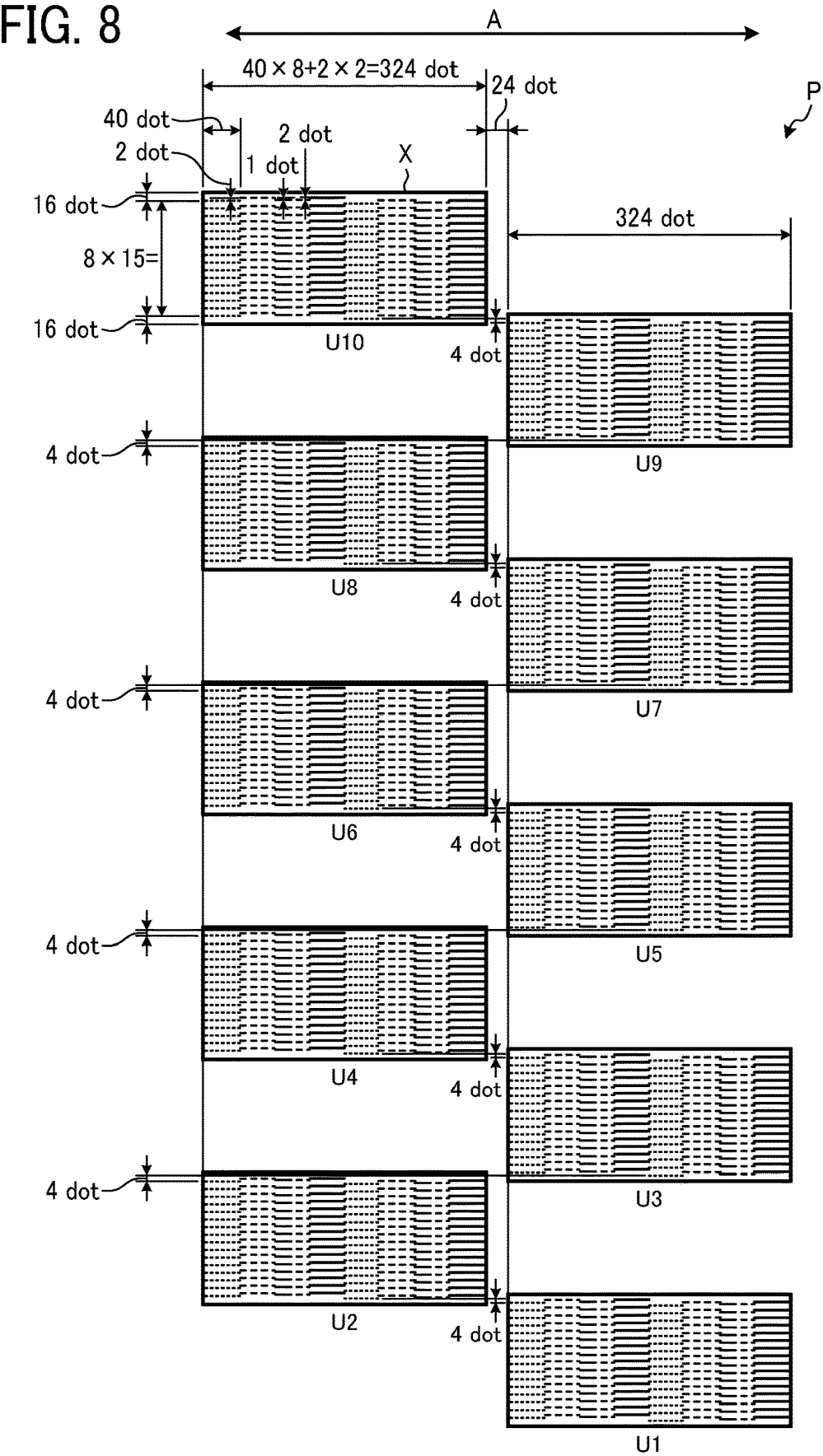
FIG. 8 illustrates a test pattern according to one embodiment.
Figure 9:
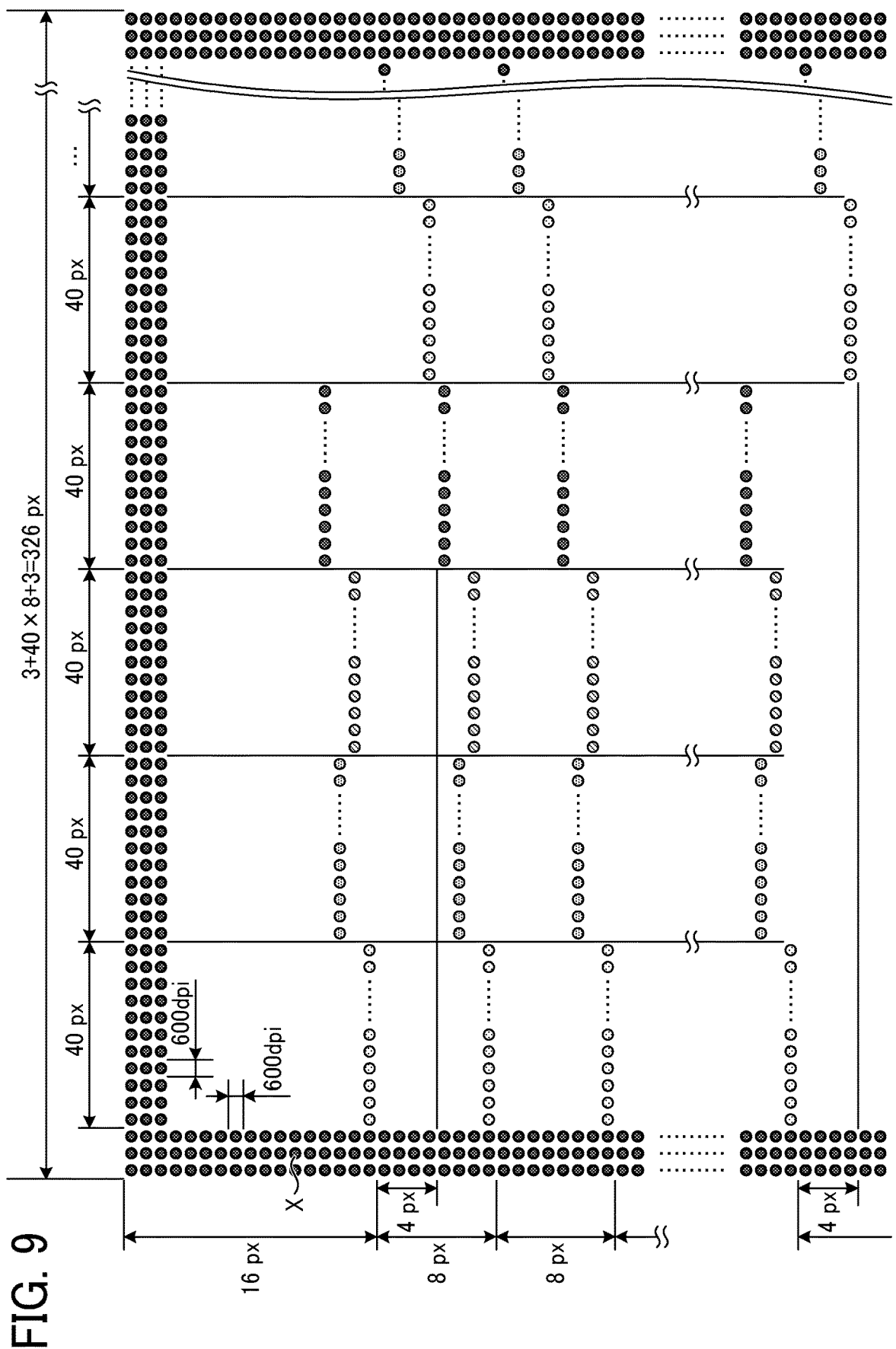
FIG. 9 is an enlarged view of one unit of the test pattern illustrated in FIG. 8.

FIG. 8 is a diagram illustrating a configuration of the test pattern P, and FIG. 9 is an enlarged view of one segment (unit pattern) of the test pattern P. In FIG. 8, a frame line X of the test pattern P is a line of 2-dot width. As illustrated in FIG. 8, the pattern forming unit 401 divides the nozzles of one recording head 106 into ten units of nozzles, to respectively form units U1 to U10 of the test pattern P. More specifically, the pattern forming unit 401 defines that one unit includes 128 nozzles (32 nozzles×4 arrays). The unit U1 of the test pattern P correspond to 32 nozzles of the recording head 106 at the bottom in FIG. 3, and the unit U10 corresponds to 32 nozzles of the recording head 106 at the top in FIG. 3.

As illustrated in FIG. 9, in one unit, the pattern forming unit 401 discharges 40 dots of ink to form a line extending in the main scanning direction A with one nozzle. Forming a line instead of one dot as described above can facilitate detection of the image formed by the defective nozzle using the 2-D image sensor 121.

Further, as illustrated in FIGS. 8 and 9, in one unit, the pattern forming unit 401 forms, with even-numbered nozzles (even-numbered rows), four left-side columns of respective color lines and forms, with odd-numbered nozzles (odd-numbered rows) four right-side columns of respective color lines. The columns are along the sub-scanning direction B (the nozzle array direction). That is, the number of columns of lines in each of the units U1 to U10 of the test pattern P is twice as many as the number of nozzle arrays. In addition, the pattern forming unit 401 forms the test pattern P such that each unit of the test pattern P is alternately arranged in a staggered pattern.

In the present embodiment, the number of columns in each unit of the test pattern P is twice as many as the number of nozzle arrays. However, the number of columns is not limited thereto and can be greater than the twice as many as the number of nozzle arrays.

Figures 10, 11:
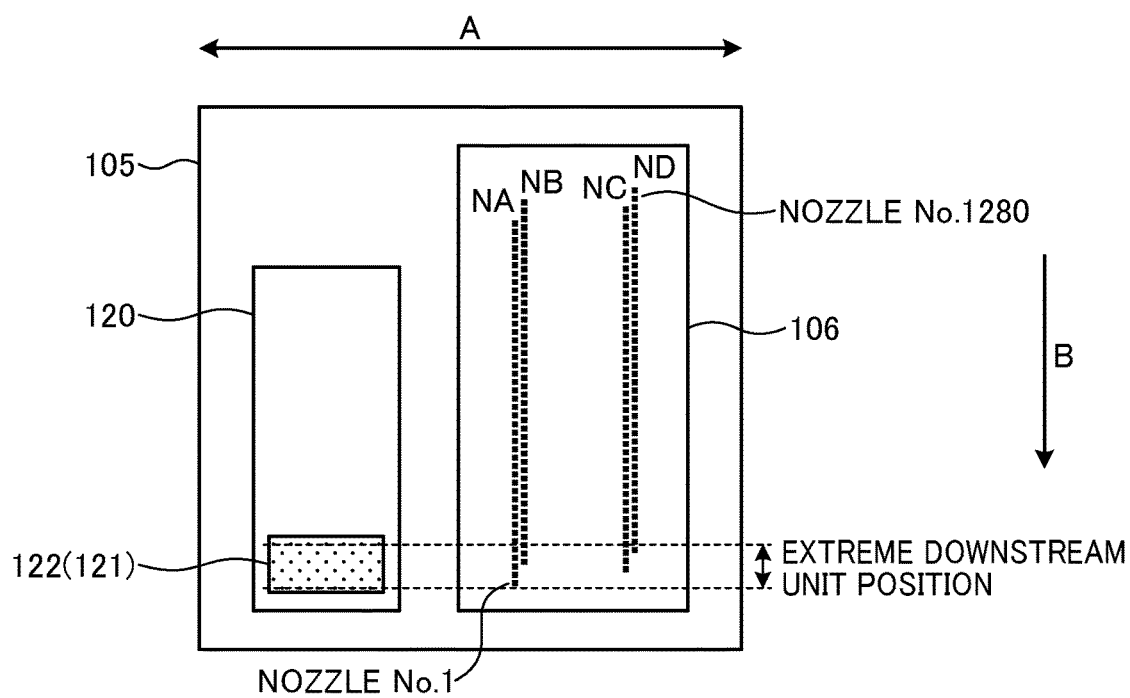
FIG. 10 is a diagram illustrating an example of relationship between the test pattern and nozzles.
FIG. 11 is a diagram illustrating a relationship between an imaging unit and a nozzle position.

FIG. 10 is a diagram illustrating the relative positions between the test pattern P and the nozzles. The relative positions between the test pattern P and the nozzles illustrated in FIG. 10 represent the relationship between the nozzle numbers and the lines in the unit U1 illustrated in FIG. 8 (see also FIG. 4).

With such relationship, in each unit of the test pattern P, spaces are secured in the sub-scanning direction B so that dots formed with the upper and lower nozzles do not overlap. Further, since the test pattern P is available with one scan of the carriage 105 in the main scanning direction A, the time for printing the pattern can shorten, and the size of the test pattern P can be compact. Accordingly, this configuration can minimize the number of times of reading by the 2-D image sensor 121.

Further, as illustrated in FIGS. 8 and 9, considering the stopping precision of the carriage 105, each unit of the test pattern P can include the frame line X (e.g., a black line) as a reference mark with which at least three of the four corners of the unit are detectable with the 2-D image sensor 121. The frame line X is a pattern smaller than the image capture range of the 2-D image sensor 121. With the frame line X, each unit of the test pattern P can be reliably set within the image capture range of the 2-D image sensor 121.

The reference mark is not necessarily shaped like a frame as long as the reference mark includes lines or points to identify at least three of the four corners. In that case, reference position coordinates indicating both ends are calculated from the data of the four corners. Further, the reference mark has a size including a margin in consideration of reading position errors in the 2-D image sensor 121.

There may be cases where the recording head 106 does not include black (K) ink, or the black frame line X is not available with the combination of ink colors. In such a case, the pattern forming unit 401 can be configured to initially form of the reference mark and then form a pattern for each nozzle position in a subsequent scanning.

As illustrated in FIG. 8, the pattern forming unit 401 forms the test pattern P such that 10 units thereof are shifted from each other in the main scanning direction A. As a result, the test pattern P (including 10 units) for one recording head 106 can be formed without feeding the sheet M at least by the amount corresponding to one recording head 106. That is, one test pattern P can be formed with only the movement of the carriage 105 in the main scanning direction A. Forming the image (the test pattern P) without conveying the sheet M in the sub-scanning direction B can eliminate positional deviation of the image due to conveyance errors.

The 2-D sensor instruction unit 403 issues an instruction to move the 2-D image sensor 121 to a position above a unit of the test pattern P.

In response to the instruction from the 2-D sensor instruction unit 403, the nozzle position detection unit 501 moves the 2-D image sensor 121 onto the designated unit of the test pattern P. Then, based on the captured data obtained by the 2-D image sensor 121, the nozzle position detection unit 501 corrects the magnification and detects the nozzle position.

FIG. 11 is a diagram illustrating the relative positions between the imaging unit 120 and the nozzle position. As illustrated in FIG. 11, the imaging unit 120 is disposed such that the image forming lens 122 (the 2-D image sensor 121) is positioned side by side with the extreme downstream nozzle unit of the recording head 106, corresponding to the unit U1, in the sub-scanning direction B. The image capture range in one imaging of the imaging unit 120 is substantially the same as the size of one unit in the test pattern P.

Figure 12:
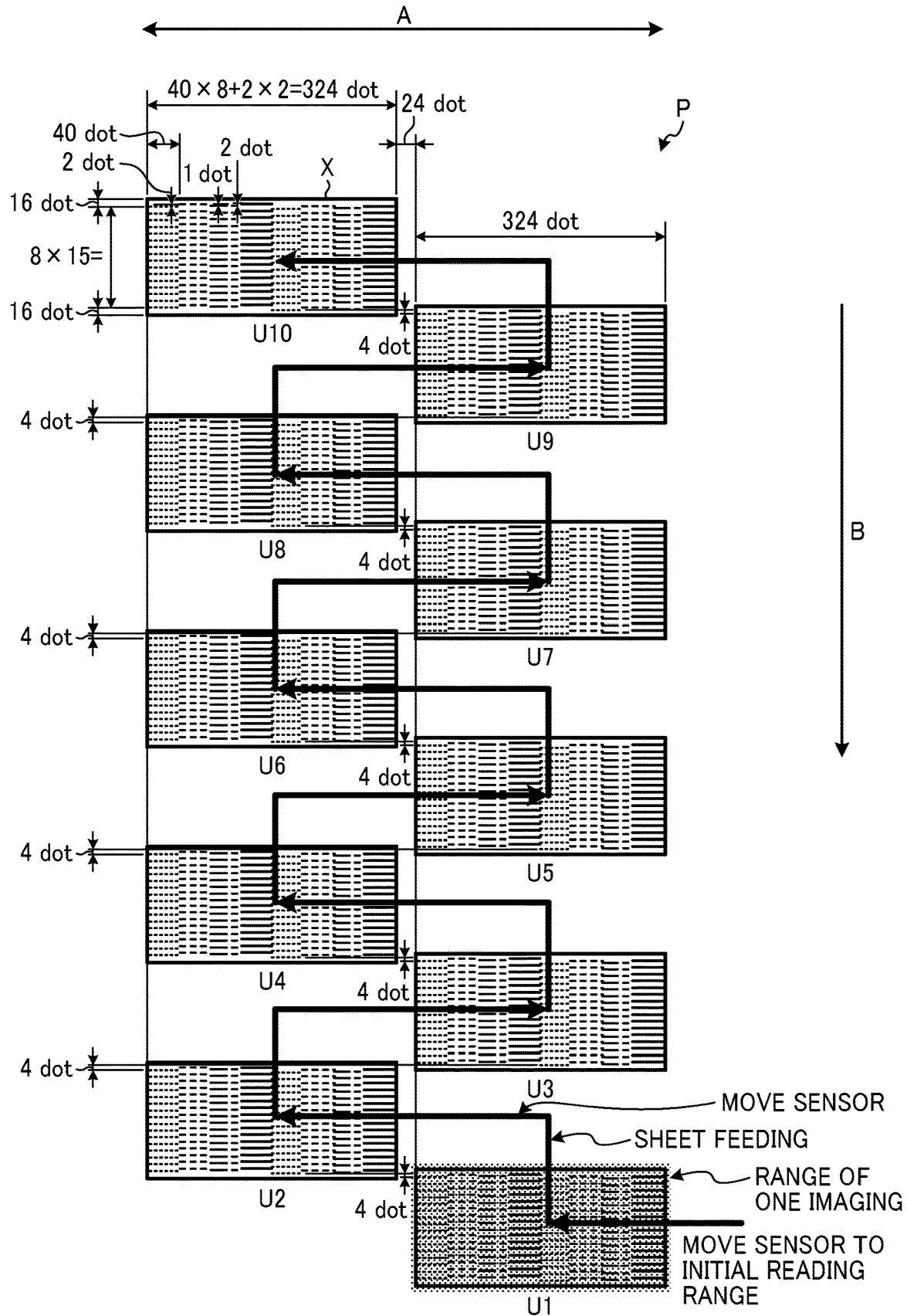
FIG. 12 is a diagram illustrating an order of reading of units in the test pattern.

FIG. 12 is a diagram illustrating the order of reading of units in the test pattern P. As illustrated in FIG. 12, according to the instruction from the 2-D sensor instruction unit 403, the nozzle position detection unit 501 controls the carriage 105 to move the recording head 106 and the imaging unit 120 to the unit U1 of the test pattern P, which is the initial reading position. As a result, the test pattern P can be read while conveying the sheet M in the sub-scanning direction B without conveying the sheet M in reverse after completion of printing of the test pattern P. Since reverse conveyance is not performed, time loss does not occur. Obviating reserve conveyance is advantageous also in avoiding inconveniences such as deviations in reading position due to reduced conveyance accuracy (influenced by paper slipping or the like).

FIG. 13 is a diagram illustrating a method of detecting the nozzle position. In the example illustrated in FIG. 13, the frame line X is formed with lines LA, LB, LC, and LD. Although the nozzle position of the recording head 106 is not accurately detected if the absolute distance (the number of pixels) between the lines LA and LB and that between the lines LC and LD change corresponding to the distance between the sheet M and the 2-D image sensor 121, the above-described frame line X can solve such a problem. More specifically, the nozzle position detection unit 501 divides the image data between the reference lines LC and LD into eight equal parts and locates the nozzle array (reading position) by the relative distance instead of the absolute distance. Such processing is advantageous in that, even when the magnification changes, the magnification can be corrected to accurately detect the position. Similarly, the nozzle position detection unit 501 divides the image data between the reference lines LA and LB into 16 equal parts and locates the nozzle position with the relative distance instead of the absolute distance.

FIGS. 14A to 14D are graphs illustrating examples of plotting of values read by the 2-D image sensor 121. The plot examples illustrated in FIGS. 14A to 14D represent red, green, and blue (RGB) value data for each pixel position of the image captured by the 2-D image sensor 121 by the method illustrated in FIG. 13. The plot examples illustrated in FIGS. 14A to 14D represents RGB value data for each pixel position of cyan, yellow, magenta, and black in the order of FIGS. 14A to 14D. In FIGS. 14A to 14D, the horizontal axis represents pixel positions, and the vertical axis represents RGB values obtained by normalization of three RGB values into 0 to 1, to plot the values in one graph. Regarding the yellow data in FIG. 14B, other colors than blue (B), which is a complementary color, have no contrast and are not detectable. Accordingly, the largest contrast value (the blue value in FIG. 14B) is selected.

Figure 15:
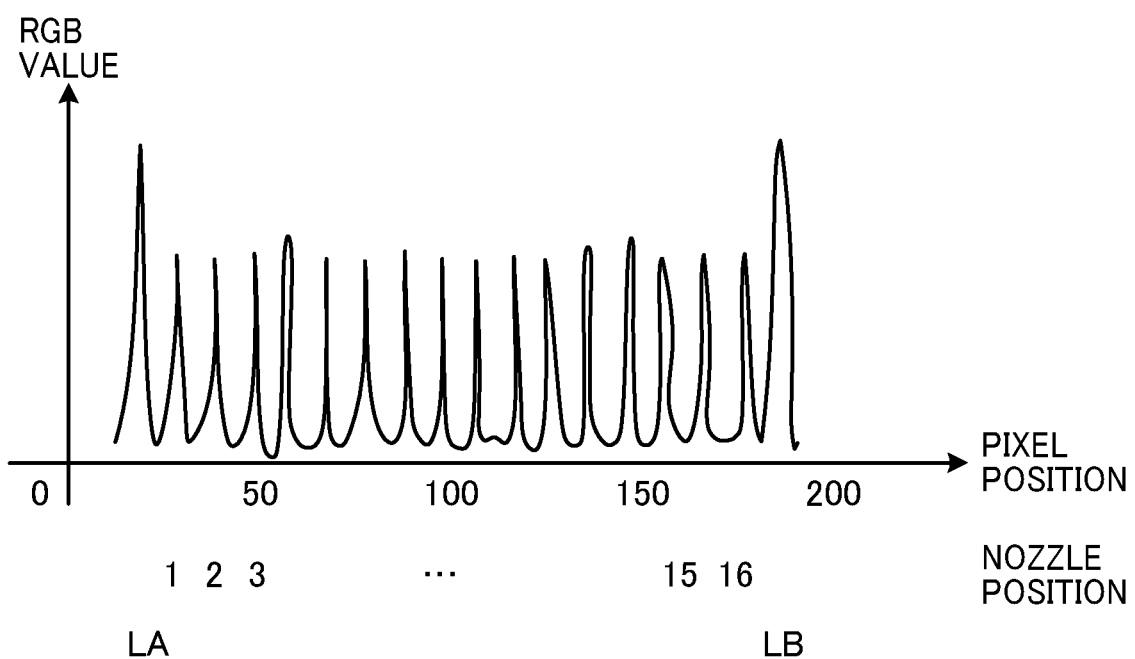
FIG. 15 is a diagram illustrating an example of detection data.
Figure 16:
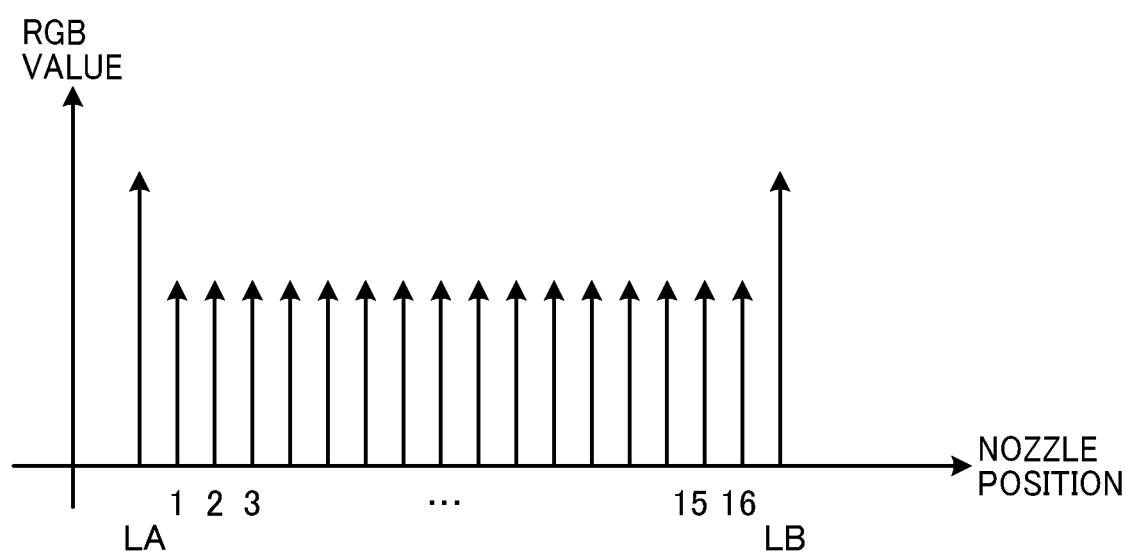
FIG. 16 is a diagram illustrating an example in which values of the detection data are replaced with respective peak values for the nozzle position.

FIG. 15 is a diagram illustrating an example of data for detection. For example, as illustrated in FIG. 15, the nozzle position detection unit 501 selects a largest contrast data that is largest in contrast (largest in amplitude) from the RGB data in FIGS. 14A to 14D to be used as the data for detection. The data having the largest contrast is selected because the possibility of erroneous detection is small when the amplitude is larger. As illustrated in FIG. 15, the nozzle position detection unit 501 vertically inverts the selected data and holds the maximum value (peak value) as the value for each nozzle position. Alternatively, data averaged by equally divided intervals (pixel range) may be used. FIG. 16 is a diagram illustrating an example in which the data for detection is replaced with a peak value for each nozzle position.

The nozzle position detection unit 501 can divide the image data into 16 into equal parts regarding the both ends as the positions of the reference lines LA and LB, thereby identifying the nozzle position. At this time, precisely dividing the image data into 16 equal parts is not required. When the distances from the reference lines LA and LB are determined by the ratio, the nozzle position detection unit 501 can calculate the nozzle position based on the relative distance determined by the ratio and the relative positions of the nozzles evenly spaced.

The discharge defect detection unit 502 detects, from the data at the nozzle position detected by the nozzle position detection unit 501, whether defective nozzle is present for each column of one unit and transmits detection data to the main control unit 301.

Figure 17A:
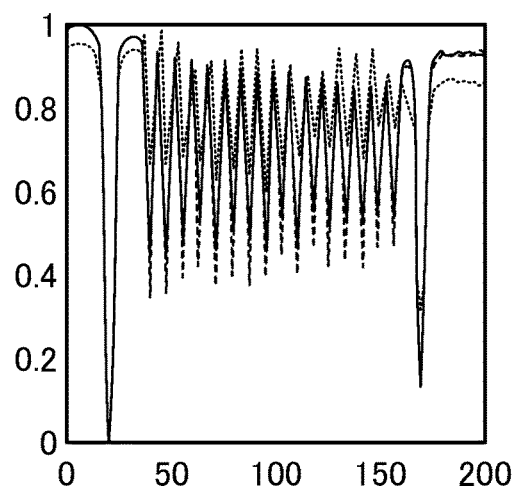
FIGS. 17A and 17B graphs illustrating example plots when a nozzle has a discharge defect.
Figure 17B:
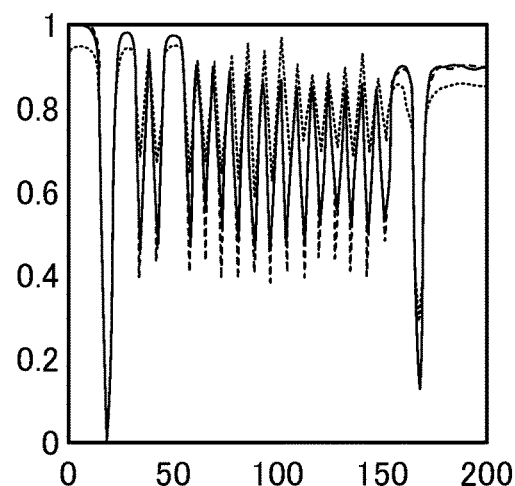
Figure 18:
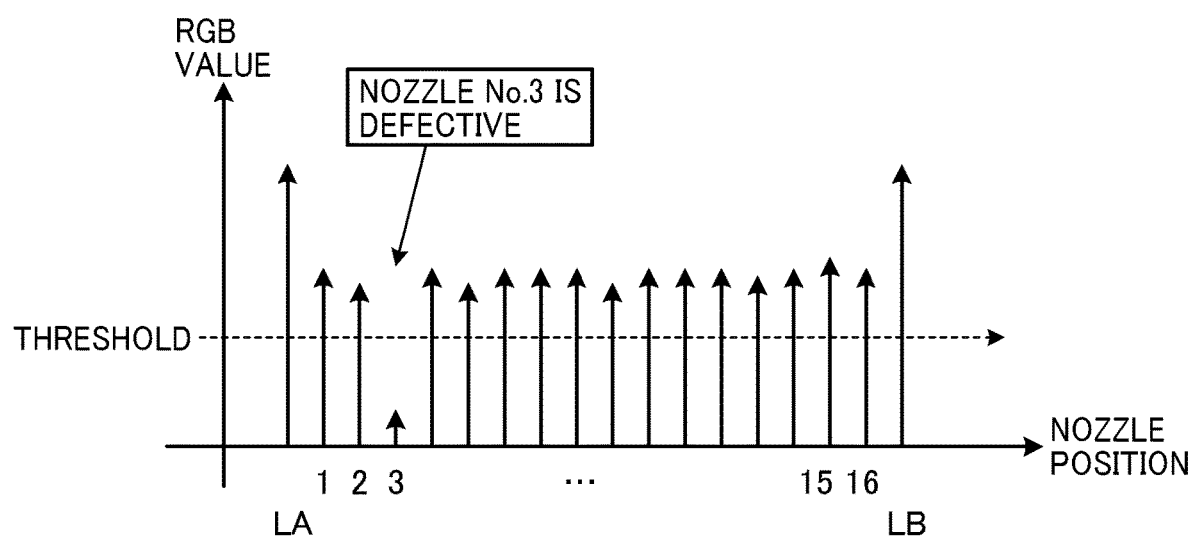
FIG. 18 is a chart illustrating replaced data when values in FIGS. 17A and 17B are replaced with respective peak values for the nozzle positions including the discharge defect.

FIGS. 17A and 17B graphs illustrating example plots when a nozzle has a discharge defect. FIG. 18 is a chart illustrating a defective nozzle when the data for detection illustrated in FIGS. 17A and 17B is replaced with a peak value for each nozzle position. FIGS. 17A and 17B illustrate an example in which a normal state (illustrated in FIG. 17A) changes to a state illustrated in FIG. 17B, in which the third nozzle (from the left in FIG. 17B) has a discharge defect. In the example illustrated in FIG. 18, the RGB value of the third nozzle position is lower than the threshold. The discharge defect detection unit 502 transmits, to the main control unit 301, the nozzle position information indicating the position where the RGB value is lower than the threshold (discharge defect portion). The discharge defect detection unit 502 transmits the nozzle position information for each column in each unit.

The defective nozzle registration unit 404 identifies the defective nozzle based on the data sent from the 2-D sensor CPU 123 for each unit of the test pattern P and registers the position (number) of the defective nozzle. When there is a plurality of recording heads 106, the defective nozzle registration unit 404 identifies the respective nozzles of the recording heads 106.

Figure 19:
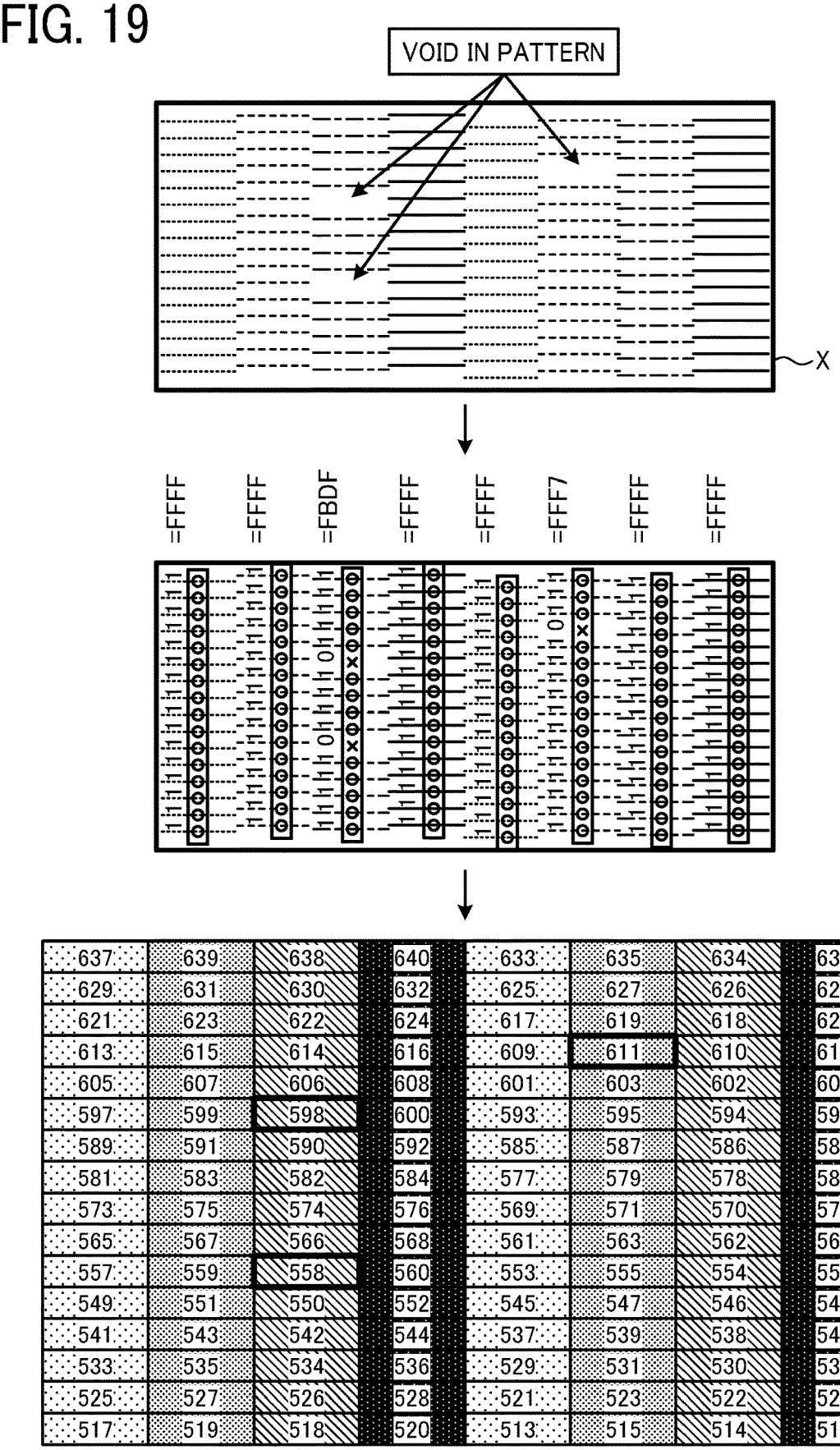
FIG. 19 is a diagram schematically illustrating a process up to registration of the position of a defective nozzle, according to Embodiment 1.

FIG. 19 is a diagram schematically illustrating process up to the registration of the defective nozzle position. As illustrated in FIG. 19, in response to a reception of the nozzle position information indicating the position of the nozzle having discharge defect, that is, the nozzle causing a void detected in the image captured by the 2-D image sensor 121, the defective nozzle registration unit 404 registers the position of the defective nozzle in association with the nozzle number of the recording head 106.

When a discharge defect occurs, the cleaning processing unit 402 controls the maintenance mechanism 115 to perform cleaning.

Next, a process of detecting the discharge defect nozzle will be described.

Figure 20:
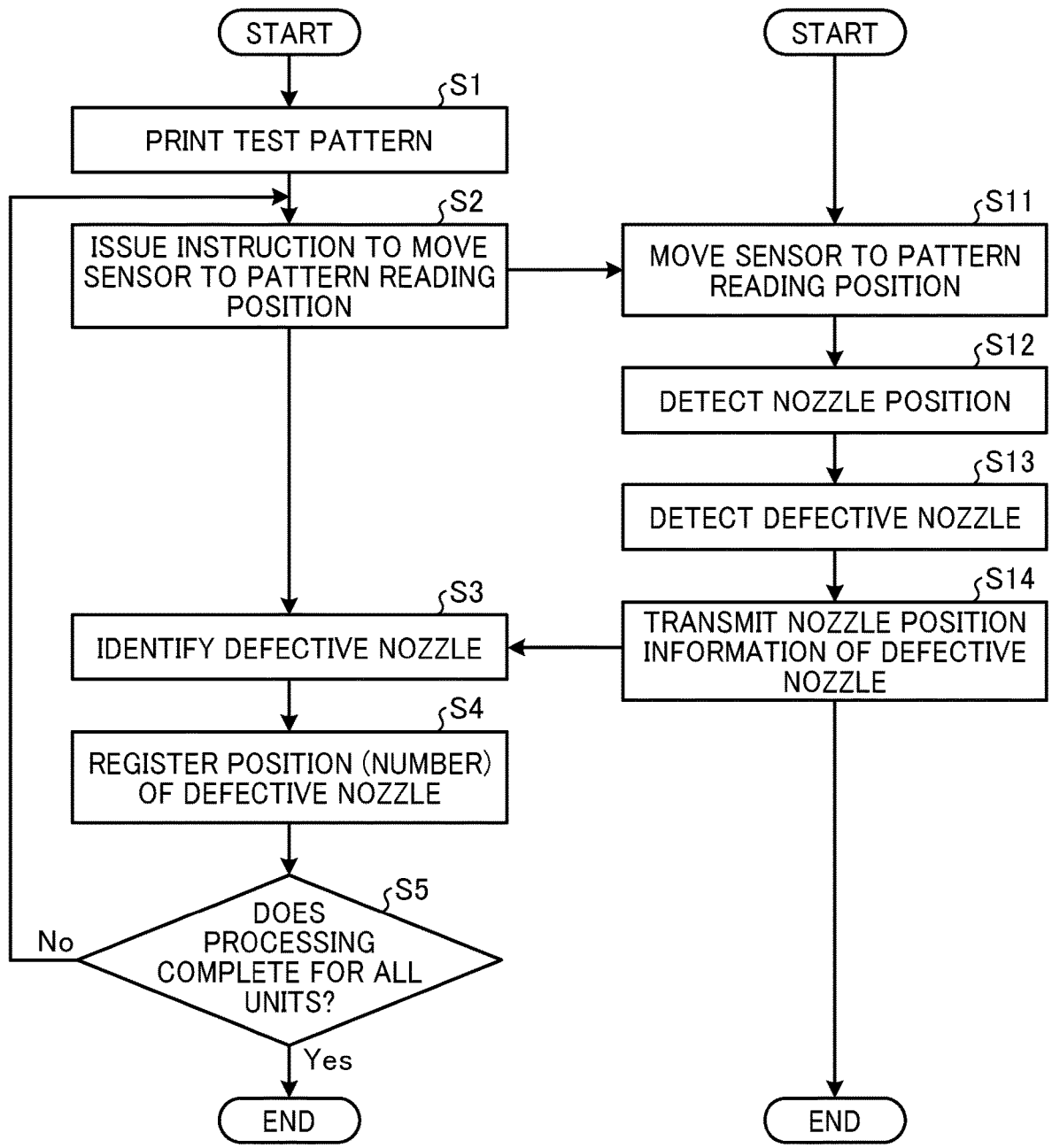
FIG. 20 is a flow chart illustrating a process for detecting a defective nozzle, according to Embodiment 1.

FIG. 20 is a flowchart illustrating the process of detecting the defective nozzle executed by the main control unit 301 and the 2-D sensor CPU 123.

At S1, the pattern forming unit 401 controls driving of the recording head 106 and the main scanning mechanism 110 to print the test pattern P on the sheet M. First, the recording head 106 prints only the black frame line X being the reference mark and then prints the units U1 to U10 inside the black frame lines X in one scanning to complete the test pattern P.

At S2, the 2-D sensor instruction unit 403 instructs the 2-D image sensor 121 to move to a position (a reading position of the test pattern P) above one of the units U1 to U1 to be read.

In accordance with an instruction from the 2-D sensor instruction unit 403, the nozzle position detection unit 501 moves the 2-D image sensor 121 onto a unit that is the reading position of the test pattern P (S11).

Next, the nozzle position detection unit 501 corrects the magnification and detects the nozzle position based on the data of the image of one unit of the test pattern P, captured by the 2-D image sensor 121 (S12).

Subsequently, the discharge defect detection unit 502 detects a discharge defect nozzle within one unit, based on the data of the nozzle position detected by the nozzle position detection unit 501 (S13).

Then, the discharge defect detection unit 502 transmits the nozzle position information of the defective nozzle within one unit to the main control unit 301 (S14).

At S3, the defective nozzle registration unit 404 identifies the defective nozzle based on the received nozzle position information of the defective nozzle (S3).

At S4, the defective nozzle registration unit 404 registers the position (number) of the defective nozzle. By using the information of the nozzle position (number) of the defective nozzle thus registered, the inkjet recording apparatus 100 can complement the image formed by the defective nozzle with ink discharged by another recording head.

When the detection of the defective nozzle has not been completed for all units of the test pattern P (No in S5), the process returns to S2. Then, the 2-D sensor instruction unit 403 moves the 2-D image sensor 121 to the next unit of the test pattern P.

On the other hand, when the detection of defective nozzles has been completed for all units of the test pattern P (Yes in S5), the 2-D sensor instruction unit 403 ends the process of detecting the discharge defect nozzle.

As described above, according to the present embodiment, the number of columns of lines included in one unit of the test pattern P is equal to or greater than the twice the number of nozzle arrays of one recording head 106. This configuration is advantageous in reducing the size of the test pattern and enabling formation of the test pattern P in one scan with overlapping of dots formed by adjacent nozzles prevented. Accordingly, the number of scans in forming the test pattern P and the number of times of reading of the test pattern P can be reduced. Further, the test pattern P can be formed without conveyance of the sheet M. Therefore, the defective nozzle can be efficiently detected with effects of conveyance amount error can be reduced.

Additionally, the 2-D image sensor 121 is placed in a position corresponding to the extreme downstream nozzle unit of the recording head 106 in the sub-scanning direction B. As a result, the test pattern P can be read while conveying the sheet M only in the sub-scanning direction B without conveying the sheet M in reverse after completion of printing of the test pattern P.

Next, a modification is described below.

The description above concerns the detection of defective nozzles in one recording head 106 (including the multiple liquid discharge heads). However, embodiments of the present disclosure are not limited thereto but can adapt to a structure including a plurality of recording heads 106 arranged side by side.

Figure 21:
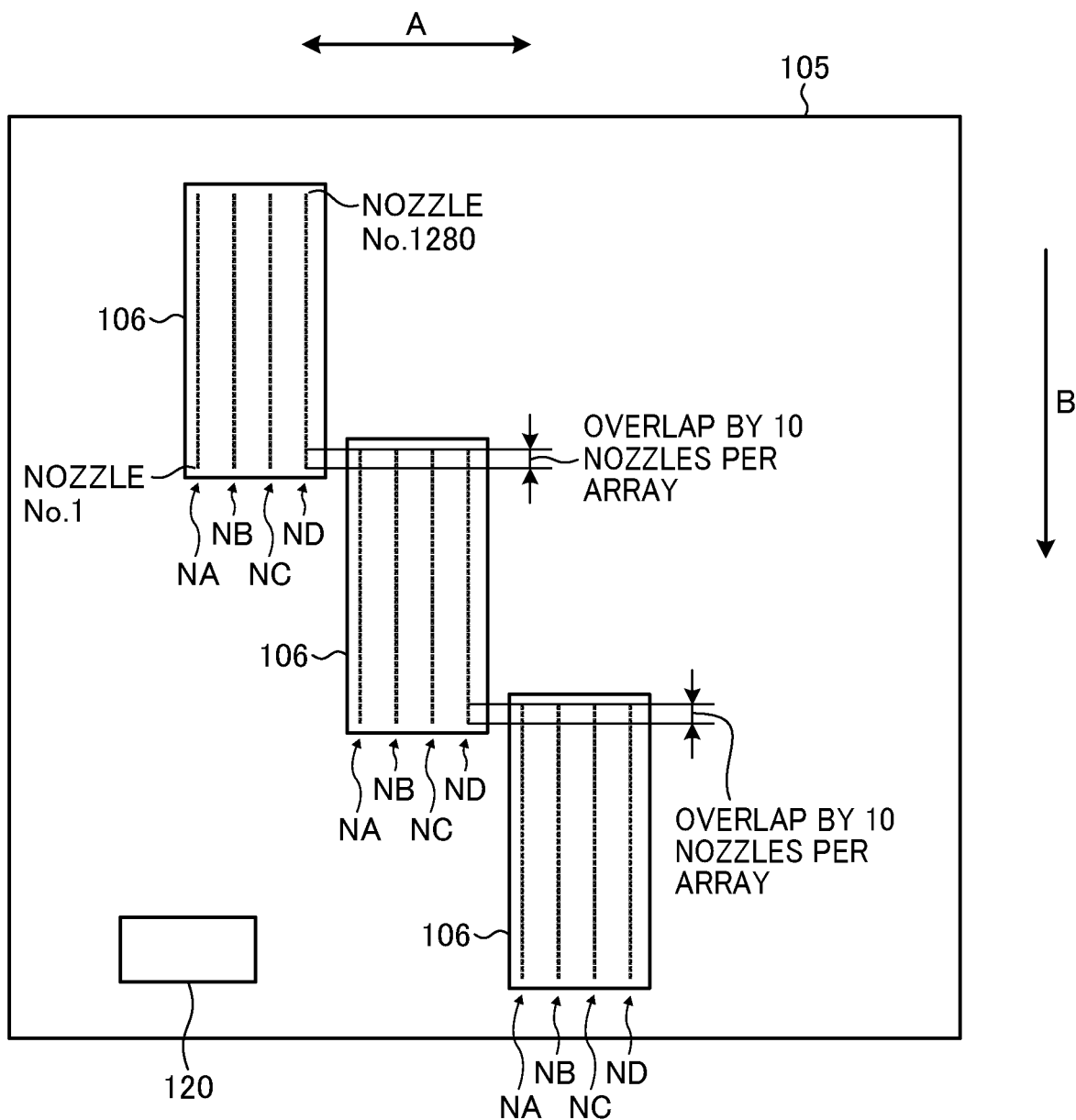
FIG. 21 is a plan view illustrating an arrangement example of recording heads according to a modification.

FIG. 21 is a plan view illustrating an example of arrangement of the recording heads 106 according to a modification of Embodiment 1. In the example illustrated in FIG. 21, the three recording heads 106 are arranged in a zigzag pattern. In addition, the three recording heads 106 are arranged such that the nozzle arrays overlap by 10 nozzles in the sub-scanning direction B of the sheet M.

As illustrated in FIG. 21, the imaging unit 120 is disposed such that the image forming lens 122 (the 2-D image sensor 121) is on a side of the extreme downstream unit of the extreme downstream recording head 106 in the sub-scanning direction B.

Figure 22:
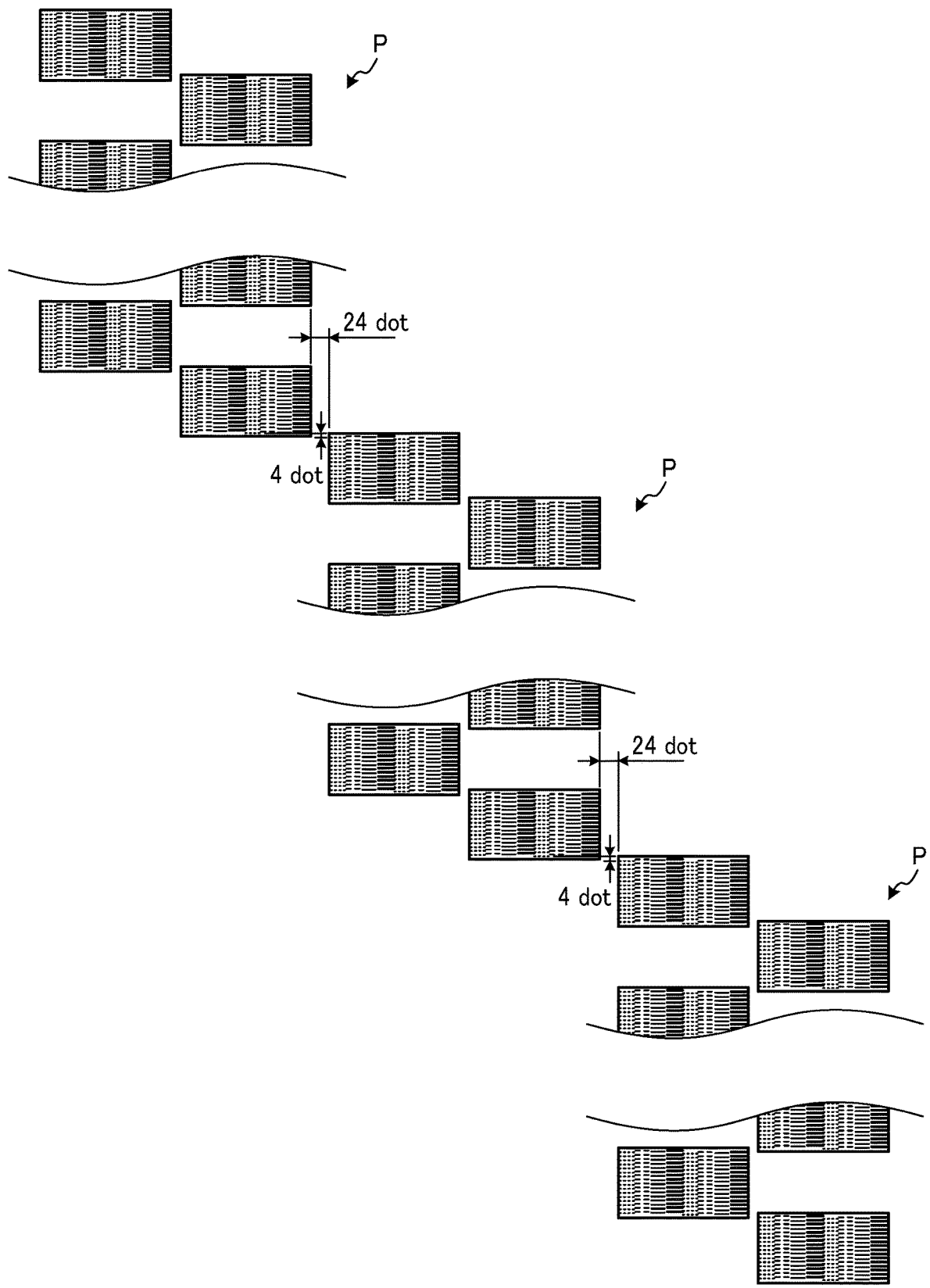
FIG. 22 is a diagram illustrating a configuration of a test pattern according to the modification.

FIG. 22 is a diagram illustrating a configuration of the test pattern P according to the modification. As illustrated in FIG. 22, the pattern forming unit 401 forms the test pattern P (see FIG. 8), which includes 10 units U1 to U10, for each of the three recording heads 106. The units U1 to U10 are respectively formed by 10 units of nozzles of one recording head 106. That is, the pattern forming unit 401 forms the test pattern P corresponding to one carriage, that is, 30 units of test pattern P (10 units per each of three heads) on the sheet M. Further, the pattern forming unit 401 shifts the three test patterns P, which respectively correspond to the three recording heads 106, in the main scanning direction A from each other.

As a result, the three test patterns P (each including 10 units) for the three recording heads 106 can be formed without feeding the sheet M at least by the distance corresponding to the three recording heads 106. That is, three test patterns P can be formed with only the movement of the carriage 105 in the main scanning direction A. Forming the image (the test pattern P) without conveying the sheet M in the sub-scanning direction B can eliminate positional deviation of the image due to conveyance errors.

Alternatively, the three test patterns P corresponding to the three recording heads 106 may be lined in the sub-scanning direction B. However, when the test patterns P are shifted in accordance with the arrangement of the recording heads 106 in the main scanning direction A, the time of ink discharge and the distance of scanning can be reduced.

In this case, the process of detecting the defective nozzle is similar to the above-described process for one recording head 106. Specifically, according to the instruction from the 2-D sensor instruction unit 403, the nozzle position detection unit 501 controls the carriage 105 to move the recording head 106 and the imaging unit 120 to the unit U1 (the initial reading position) of the test pattern P corresponding to the extreme downstream recording head 106 in the sub-scanning direction B. Then, the imaging unit 120 performs image capturing.

Embodiment 2

Next, Embodiment 2 is described.

Embodiment 2 is different from Embodiment 1 in that the inkjet recording apparatus 100 further includes an LED light source that emits ultraviolet light as a light source for image capturing of the 2-D image sensor 121. In the following, descriptions of the configurations similar to those in Embodiment 1 will be omitted, and features of Embodiment 2 different from Embodiment 1 will be described.

Figure 23:
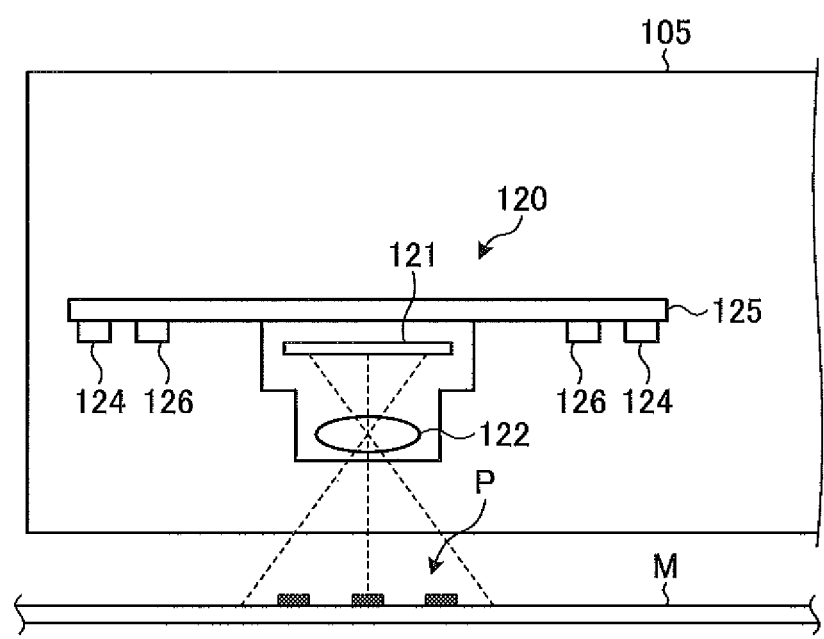
FIG. 23 is a cross-sectional view illustrating an example of a configuration of an imaging unit according to Embodiment 2.

FIG. 23 is a cross-sectional view illustrating an example of the configuration of the imaging unit 120 according to Embodiment 2. The imaging unit 120 according to the present embodiment includes, in addition to the white LED light sources 124 that emit visible light, LED light sources 126 that emit ultraviolet light as light sources for image capturing by the 2-D image sensor 121. The LED light sources 126 to emit ultraviolet light are disposed on the board 125 symmetrically with respect to the 2-D image sensor 121. In addition, the white LED light source 124 that irradiates visible light and the LED light source 126 that irradiates ultraviolet light are lined. The LED light source 126 can be inward or outward the white LED light source 124 with respect to the 2-D image sensor 121.

FIGS. 24A to 24D are examples of graphs illustrating RGB value data for each pixel position when an ultraviolet light source is used. The data illustrated in FIGS. 24A to 24D represent RGB value data for each pixel position of the image captured by the 2-D image sensor 121 by the method illustrated in FIG. 13, with the imaging target irradiated with ultraviolet light emitted from the LED light sources 126 of the imaging unit 120.

Figure 24A:
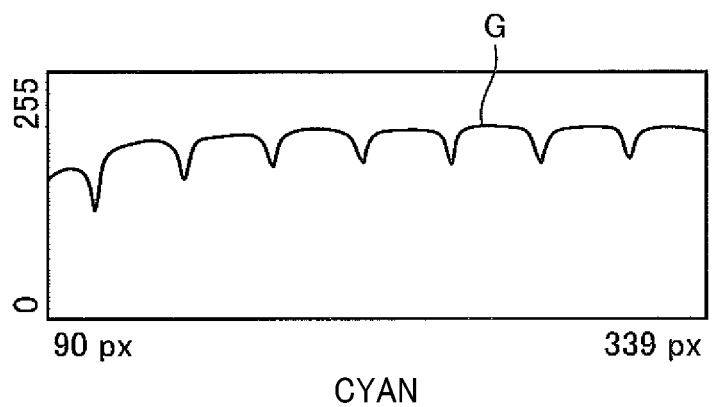
FIGS. 24A to 24D are examples of graphs of RGB value data for each pixel position when an ultraviolet light source is used.
Figure 24B:
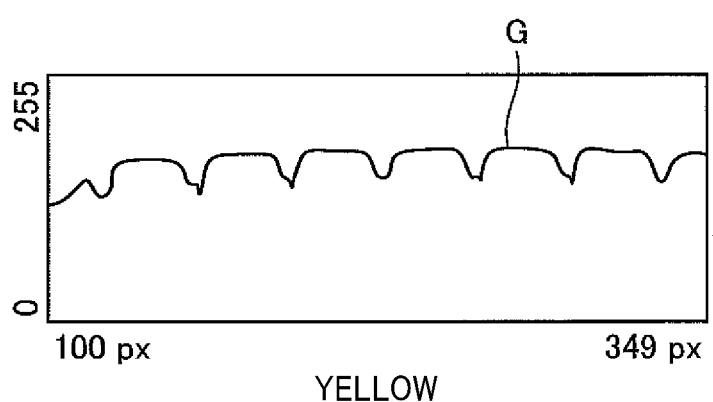
Figure 24C:
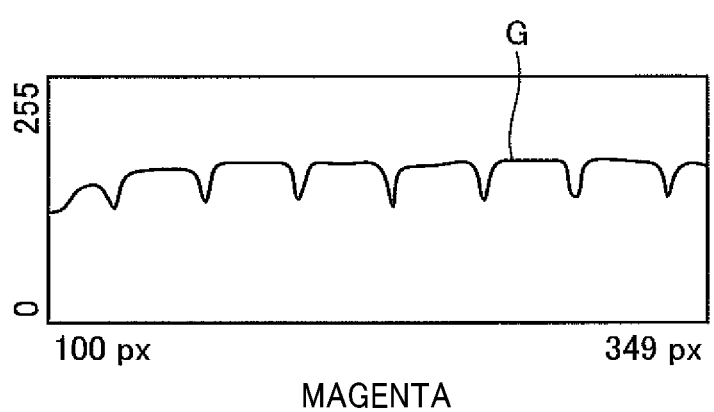
Figure 24D:
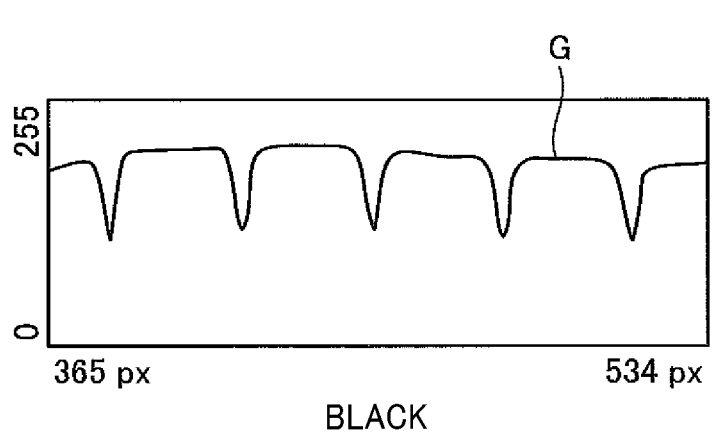

FIG. 24A is an example of data obtained by reading cyan, FIG. 24B is an example of data obtained by reading yellow, FIG. 24C is an example of data obtained by reading magenta, and FIG. 24D is an example of data obtained by reading black. In FIGS. 24A to 24D, the lateral axis represents the pixel position, and the vertical axis represents values obtained by normalization of the three RGB values into 0 to 255, to plot the values in one graph.

As illustrated in FIGS. 24A to 24D, in the reading results by the 2-D image sensor 121 with ultraviolet light irradiation from the LED light sources 126, the R and B values are saturated at the maximum and only the G value can be read. However, the nozzle position detection unit 501 can detect the nozzle position as long as contrast is present in any of RGB values. In the case where the LED light sources 126 are used, the contrast is obtained with the G values. Accordingly, the nozzle position detection unit 501 can detect the test pattern P even when ultraviolet light is used.

Figure 25A:
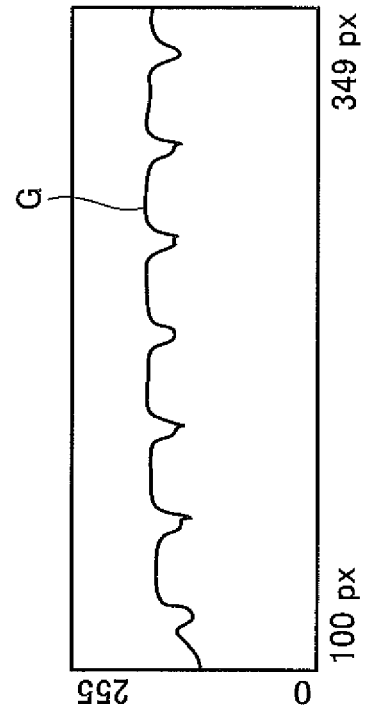
FIGS. 25A to 25D are graphs illustrating examples of comparison of measurement results when different light sources are used.
Figure 25B:
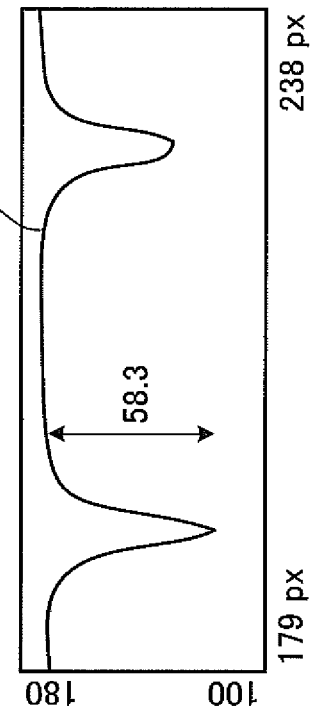

FIGS. 25A to 25D are graphs illustrating examples of comparison of measurement results when different light sources are used. FIGS. 25A to 25D present the comparison between results of reading of yellow obtained with different light sources. FIG. 25A presents the reading result obtained with visible light irradiation by the white LED light sources 124, and FIG. 25B presents the reading result obtained with ultraviolet light irradiation by the LED light sources 126.

Figure 25C:
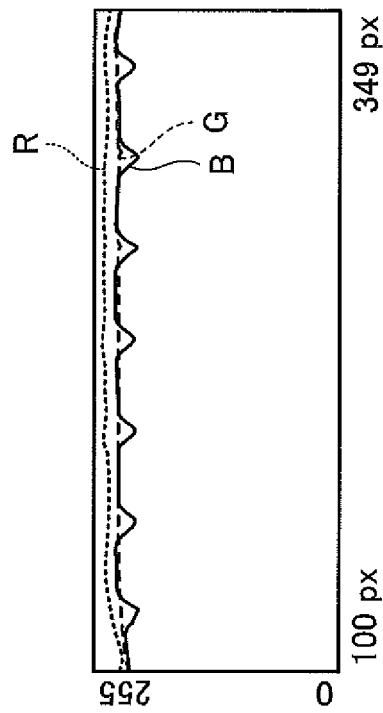
Figure 25D:
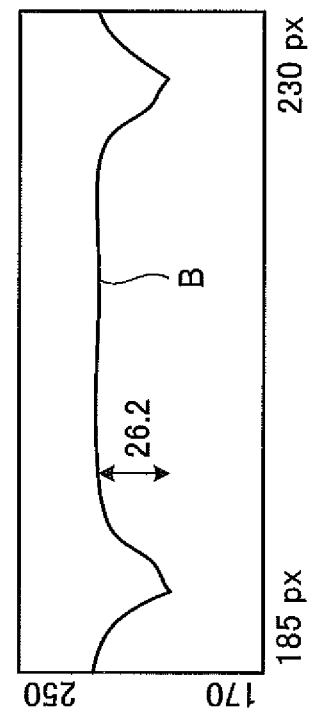

FIGS. 25C and 25D are enlarged views of contrast portions in FIGS. 25A and 25B at an equal rate. As illustrated in FIG. 25C, in the case of reading of yellow obtained with visible light irradiation from the LED light sources 124 (in FIG. 25A), the contrast of blue, which is the complementary color, appears but the value thereof is small. On the other hand, as illustrated in FIG. 25D, in the case of reading result obtained with ultraviolet light irradiation from the LED light sources 126 (in FIG. 25B), the numerical value of the contrast of green is doubled compared with the reading result obtained with visible light irradiation. Accordingly, reading is easier.

Next, a test pattern P' in the present embodiment will be described.

Figure 26:
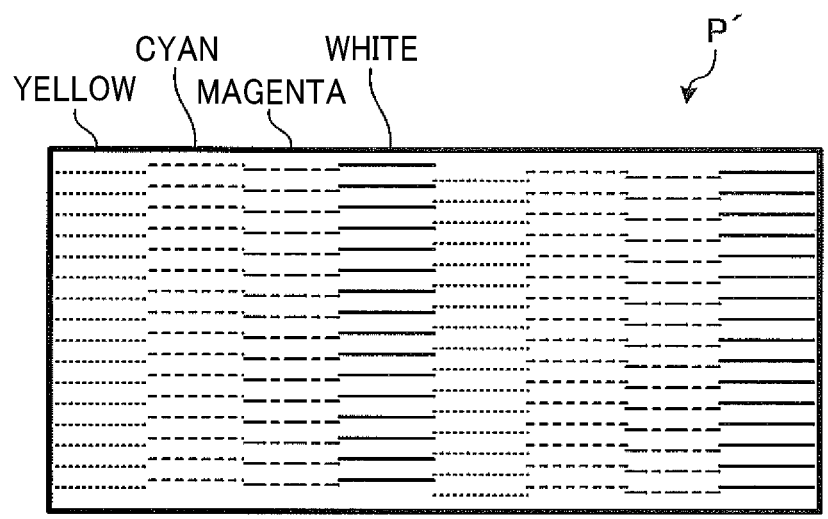
FIG. 26 illustrates a test pattern according to one embodiment.

FIG. 26 is a diagram illustrating the configuration of the test pattern P'. As illustrated in FIG. 26, the test pattern P' is similar to the test pattern P illustrated in FIG. 8 in principle. However, differently from the test pattern P illustrated in FIG. 8, when the LED light sources 126 to emit ultraviolet light are used as the light sources of the imaging unit 120, the test pattern P' can has a color other than cyan, yellow, magenta, and black. Specifically, a color, such as white or fluorescent color, that is difficult to be read with visible light can be used. The test pattern P' illustrated in FIG. 26 is formed with four rows of yellow, cyan, magenta, and white.

Figure 27A:
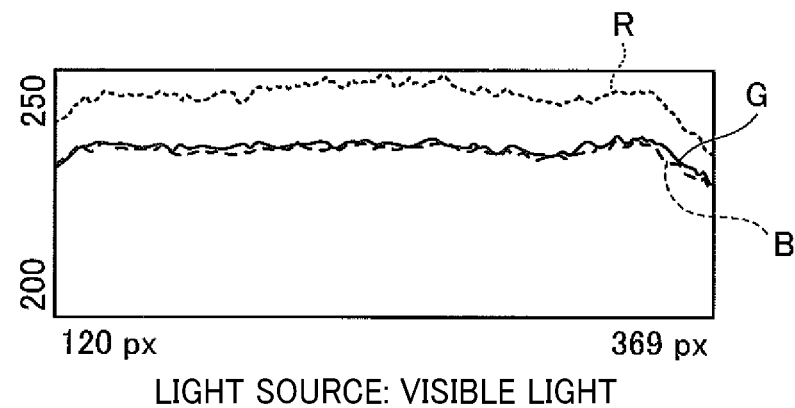
FIGS. 27A to 27C are graphs illustrating examples of comparison of results of measurement of white printing when different light sources are used.
Figure 27B:
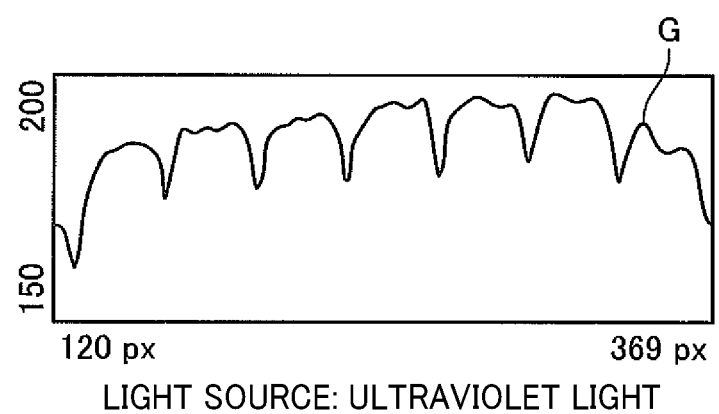
Figure 27C:
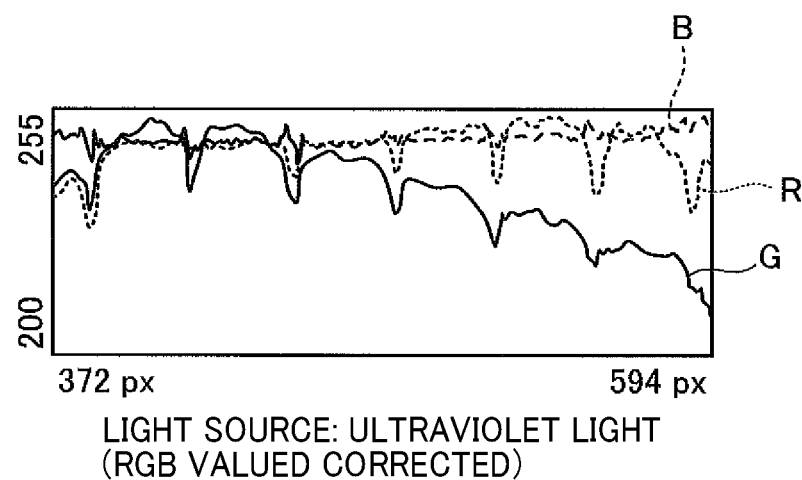

FIGS. 27A to 27C are graphs illustrating examples of comparison of results of measurement of white printing when different light sources are used. The data illustrated in FIGS. 27A to 27C is RGB value data for each pixel position when printing with white ink is read by the 2-D image sensor 121 with the method described with reference to FIG. 13. FIG. 27A illustrates the result of reading with the LED light sources 124 to emit visible light, and FIG. 27B illustrates the result of reading with the LED light sources 126 to emit ultraviolet light. In FIGS. 27A to 27C, the lateral axis represents the pixel position, and the vertical axis represents values obtained by normalization of the three RGB values into 0 to 255, to plot the values in one graph.

For example, when printing is made with white ink on a white paper sheet as the sheet P, as illustrated in FIG. 27A, with the visible light from the LED light sources 124, almost no contrast is extracted from the RGB value data, and the presence or absence of printing is not detected. On the other hand, as illustrated in FIG. 27B, with ultraviolet light from the LED light sources 126, the contrast appears in the value of green, and printing can be detected.

Further, FIG. 27C illustrates result of correcting the RGB values on the light receiving side. Correction on the light receiving side can attain a contrast even in values other than green values.

Presumably, white ink printing on white paper is rare, but there may arise a need for use of fluorescent color ink or ink of a thinner color than currently used colors. In addition, since the ultraviolet LED light sources 126 enables detection of a thin color or white undetectable with visible light or difficult for detection with visible light, the detection method according to the present embodiment is effective.

As described above, according to the present embodiment, when the LED light sources 126 to emit ultraviolet light is used in reading the test pattern by the 2-D image sensor 121, a color difficult to read with visible light can be read.

Embodiment 3

Next, Embodiment 3 is described.

The Embodiment 3 is different from Embodiment 1 in that noise and uneven illuminance are removed. In the following description of the Embodiment 3, descriptions of the same parts as in Embodiment 1 will be omitted, and portions different from Embodiment 1 will be described.

Figure 28:
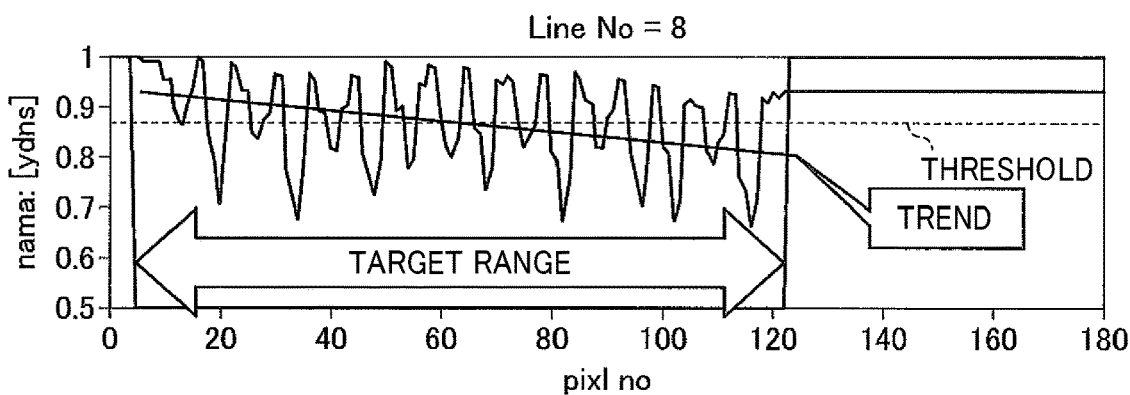
FIG. 28 is a chart illustrating a process of trend removal at the time of pattern recognition according to Embodiment 3.

FIG. 28 is a diagram illustrating trend removal processing at the time of pattern recognition according to the Embodiment 3.

The data illustrated in FIG. 28 indicates that there is uneven illuminance in the captured image by the imaging unit 120. In this case, a pattern may be missed if the inkjet recording apparatus 100 is configured to detect a peak with a threshold. If the peak is detected with reference to a threshold indicated by the dotted line in FIG. 28, the pattern at the left end in FIG. 28 will be missed.

Therefore, the nozzle position detection unit 501 according to the present embodiment performs trend removal as a first process as follows, to deal with uneven illuminance. As illustrated in FIG. 28, the nozzle position detection unit 501 sets, as a target area, the test pattern P of which the reference mark (the frame line X illustrated e.g., in FIG. 19) is masked and removes trend in order to make fluctuations in the data distinctive.

To derive the trend, a linear regression line is determined. Alternatively, a regression curve may be used to derive the trend. Trends can be eliminated using the following equation: Trend removal data (X)=data (X)−regression line (X)

Figure 29:
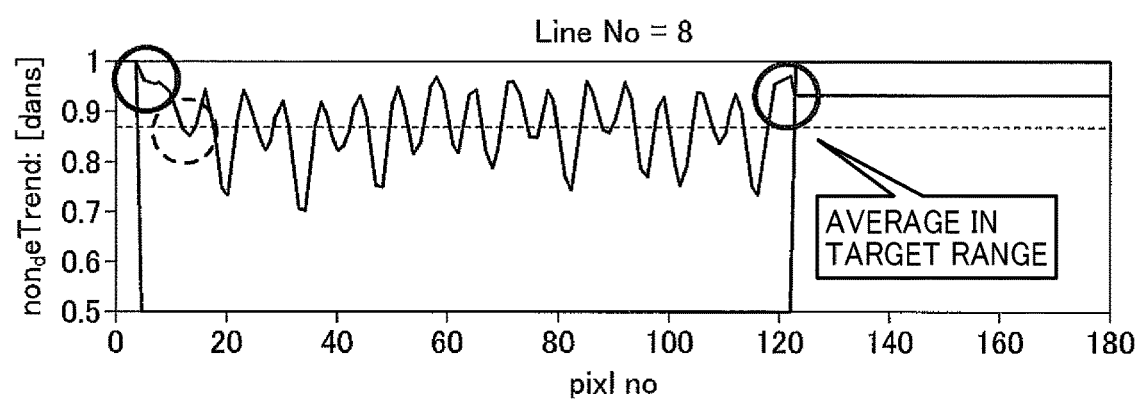
FIG. 29 is a chart illustrating data after the trend removal and smoothing.

At this time, as a second process, the nozzle position detection unit 501 preliminarily performs smoothing of the data, to avoid amplification of noise, and removes the noise. FIG. 29 is a diagram illustrating data after the trend removal and the smoothing. As illustrated in FIG. 29, through the smoothing, noise caused by uneven illuminance is removed.

Any smoothing algorithm that it is a low-pass filter can be used. The timing of such processing can be either during analog processing or digital processing. In the present embodiment, a moving average filter is used at the stage of digital processing.

In the data illustrated in FIG. 29, it is possible that the nozzle position detection unit 501 erroneously detects, as a pattern, the noise not removed, indicated by a solid circle in FIG. 29, and fails to detect a pattern of thin ink, having a small peak, indicated by a broken circle.

Therefore, as a third process, the nozzle position detection unit 501 executes removal of unnecessary noise so that thin ink can be detected. More specifically, the nozzle position detection unit 501 removes noise (indicated by the solid line in FIG. 29) between the reference line (the reference mark) and the test pattern P for identifying the nozzle position.

Figure 30:
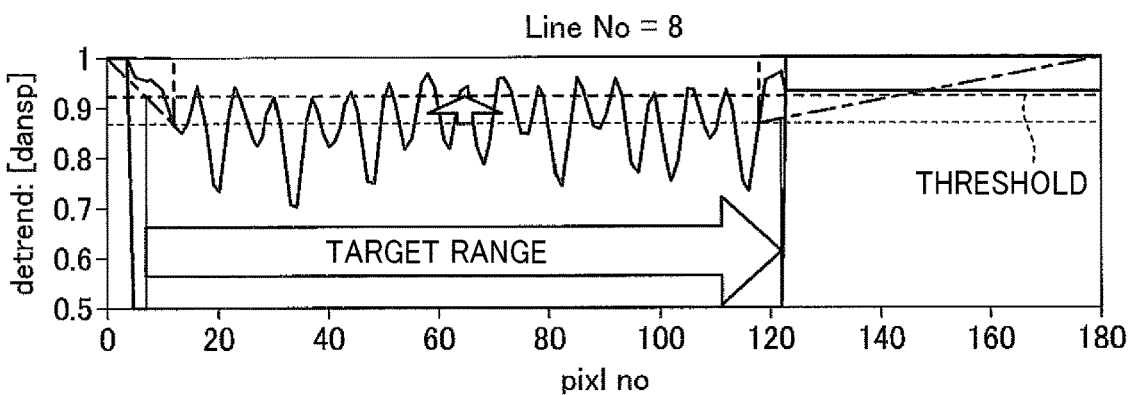
FIG. 30 is a chart illustrating data in which noise is removed and a target range is redefined.

FIG. 30 is a diagram illustrating data after the noise is removed and the target range is redefined. As illustrated in FIG. 30, in order to set only the test pattern P for identifying the nozzle position as an effective range for detection, an intersection between the threshold (thick broken lines in FIG. 30) and the target data is used.

As indicated by alternate long and short dashed lines and chain double-dashed lines in FIG. 30, data outside the outermost intersection is replaced with data that is not become noise. At this time, if the value of the intersection between the threshold (thick broken lines) and the target data is input as a constant value in the replaced data, the thinner ink at the head has a small peak and remains difficult to detect. Therefore, the outside data is replaced with data represented as the alternate long and short dashed lines having an inclination or "1" (the chain double-dashed lines) so that the replaced data easily has an intersection with the threshold indicated by the bold broken lines. Thus, the threshold for determining the effective range for detection is optimized.

As described above, according to the present embodiment, when the 2-D image sensor 121 reads the test pattern, the noise and uneven illuminance are removed to inhibit failing of detecting the leading pattern. Accordingly, the accuracy of pattern detection improves even when thin color ink is used or the pattern has uneven shade.

In the present disclosure, the "liquid discharge head" refers to a functional component configured to discharge liquid from a nozzle.

The liquid to be discharged from the nozzle of the liquid discharge head is not limited to a particular liquid as long as the liquid has a viscosity or surface tension to be discharged from the liquid discharge head. However, preferably, the viscosity of the liquid is not greater than 30 mPa·s under ordinary temperature and ordinary pressure or by heating or cooling. Examples of the liquid include a solution, a suspension, or an emulsion including, for example, a solvent, such as water or an organic solvent, a colorant, such as dye or pigment, a functional material, such as a polymerizable compound, a resin, a surfactant, a biocompatible material, such as DNA, amino acid, protein, or calcium, and an edible material, such as a natural colorant. Such a solution, a suspension, or an emulsion can be used for, e.g., inkjet ink, surface treatment liquid, a liquid for forming components of electronic element or light-emitting element or a resist pattern of electronic circuit, or a material solution for three-dimensional fabrication.

Examples of an energy source for generating energy to discharge liquid include a piezoelectric actuator (a laminated piezoelectric element or a thin-film piezoelectric element), a thermal actuator that employs an electrothermal transducer element, such as a heat element, and an electrostatic actuator including a diaphragm and opposed electrodes.

The term "liquid discharge device" represents a structure including the liquid discharge head and a functional part(s) or mechanism combined thereto. That is, "liquid discharge device" is an assembly of parts relating to liquid discharge. For example, the "liquid discharge device" may include a combination of the liquid discharge head with at least one of a supply and circulation device, a carriage, a maintenance unit, and a main scan moving unit.

Herein, the terms "combined" or "integrated" mean attaching the liquid discharge head and the functional parts (or mechanism) to each other by fastening, screwing, binding, or engaging and holding one of the liquid discharge head and the functional parts to the other movably relative to the other. The liquid discharge head may be detachably attached to the functional part(s) or unit(s).

Examples of the liquid discharge device further include a unit in which the liquid discharge head is combined with the supply and circulation device. In this case, the liquid discharge head and the supply and circulation device may be coupled to each other with a tube. Furthermore, a unit including a filter can be added at a position between the supply and circulation device and the liquid discharge head of the liquid discharge device.

In yet another example, the liquid discharge head and the carriage can be combined as "liquid discharge device".

As yet another example, the liquid discharge device is a unit in which the liquid discharge head and the main scanning moving unit are combined into a single unit. The liquid discharge head is movably held by a guide that is a part of the main scanning moving unit.

As yet another example, the liquid discharge device is a unit in which a cap that is a part of the maintenance unit is secured to the carriage mounting the liquid discharge head so that the liquid discharge head, the carriage, and the maintenance unit are combined as a single unit.

Further, in another example, a tube is coupled to the liquid discharge head mounting either the supply and circulation device or the channel member so that the liquid discharge head and the supply and circulation device are combined into a liquid discharge device. Through this tube, the liquid stored in a liquid container is supplied to the liquid discharge head.

The main scan moving mechanism may be a guide only. The supply unit can be a tube(s) only or a loading unit only.

In the present disclosure, the term "liquid discharge apparatus" includes a liquid discharge head or a liquid discharge device (unit) and drives the liquid discharge head to discharge liquid. The term "liquid discharge apparatus" used here includes, in addition to apparatuses to discharge liquid to materials to which the liquid can adhere, apparatuses to discharge the liquid into gas (air) or liquid.

The liquid discharge apparatus can also include devices to feed, convey, and discharge the material onto which liquid adheres. The liquid discharge apparatus can further include a pretreatment device to apply treatment liquid to the material before liquid is discharged onto the material and a post-treatment device to apply treatment liquid to the material after liquid is discharged onto the material.

As the liquid discharge apparatuses, for example, there are image forming apparatuses to discharge ink onto sheets to form images and three-dimensional fabricating apparatuses to discharge molding liquid to a powder layer in which powder is molded into a layer-like shape, so as to form three-dimensional fabricated objects.

The term "liquid discharge apparatus" is not limited to an apparatus to discharge liquid to visualize meaningful images, such as letters or figures. For example, the liquid discharge apparatus can be an apparatus to form meaningless images, such as meaningless patterns, or fabricate meaningless three-dimensional images.

The above-mentioned term "material to which liquid can adhere" represents a material which liquid can, at least temporarily, adhere to and solidify thereon, or a material into which liquid permeates. Examples of "material to which liquid can adhere" include paper sheets, recording media such as recording sheet, recording sheets, film, and cloth; electronic components such as electronic substrates and piezoelectric elements; and media such as powder layers, organ models, and testing cells. The term "material to which liquid can adhere" includes any material to which liquid adheres, unless particularly limited.

The above-mentioned "material to which liquid adheres" may be any material, such as paper, thread, fiber, cloth, leather, metal, plastic, glass, wood, ceramics, or the like, as long as liquid can temporarily adhere.

The "liquid discharge apparatus" can be an apparatus in which the liquid discharge head and a material to which liquid can adhere move relatively to each other. However, the liquid discharge apparatus is not limited to such an apparatus. For example, the liquid discharge apparatus can be a serial head apparatus that moves the liquid discharge head or a line head apparatus that does not move the liquid discharge head.

Examples of the "liquid discharge apparatus" further include a treatment liquid coating apparatus to discharge a treatment liquid to a sheet to coat, with the treatment liquid, a sheet surface to reform the sheet surface and an injection granulation apparatus in which a composition liquid including raw materials dispersed in a solution is discharged through nozzles to granulate fine particles of the raw materials.

The terms "image formation", "recording", "printing", "image printing", and "fabricating" used herein are synonymous with each other.

Although the descriptions above concern examples in which the liquid discharge apparatus adopting the aspects of this disclosure is a printer, the liquid discharge apparatus according to the present disclosure can be other image forming apparatus types, such as multifunction peripheral (MFP) having at least two of printing, facsimile transmission, copying, and scanning functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A liquid discharge apparatus comprising:
    a liquid discharge head having at least one nozzle array including a plurality of nozzles configured to discharge liquid, the plurality of nozzles lined in a nozzle array direction;
    a two-dimensional image sensor to capture an image formed by the liquid discharge head; and
    circuitry configured to:
        divide the plurality of nozzles into a plurality of nozzle units;
        form a pattern including a plurality of unit patterns arranged in a staggered manner, the plurality of unit patterns formed with the liquid discharged from the plurality of nozzle units, respectively,
        each of the plurality of unit patterns being smaller in size than an image capture range of the two-dimensional image sensor and including a number of columns of lines extending in a direction perpendicular to the nozzle array direction, the number of columns being not smaller than twice of a number of the at least one nozzle array;
        capture an image of each of the plurality of unit patterns using the two-dimensional image sensor;
        obtain red, green, and blue (RGB) data per unit pixel position of each of the plurality of unit patterns through capturing by the two-dimensional image sensor;
        detect largest contrast data in the RGB data;
        use the largest contrast data to identify a position of each of the plurality of nozzles; and
        determine, based on the largest contrast data for each of the plurality of nozzles, whether each of the plurality of nozzles is defective.

2. The liquid discharge apparatus according to claim 1, wherein the two-dimensional image sensor is disposed on a side of an extreme downstream one of the plurality of nozzle units in the nozzle array direction.

3. The liquid discharge apparatus according to claim 1, wherein the circuitry is configured to cause the liquid discharge head to form, with at least one of the plurality of nozzles, a mark for detecting at least three of four corners of each unit pattern.

4. The liquid discharge apparatus according to claim 3, wherein the circuitry is configured to cause the liquid discharge head to form, as the mark, a frame defined by four lines surrounding each unit pattern.

5. The liquid discharge apparatus according to claim 3, wherein the circuitry is configured to set a size of the mark to a size including a margin for a reading position error in the two-dimensional image sensor.

6. The liquid discharge apparatus according to claim 3, wherein the circuitry is configured to correct a magnification of the captured image by the two-dimensional image sensor, using the mark on the captured image.

7. The liquid discharge apparatus according to claim 1, wherein the circuitry is configured to remove noise and uneven illuminance from the RGB data of each of the plurality of unit patterns captured by the two-dimensional image sensor.

8. The liquid discharge apparatus according to claim 1, further comprising a light source configured to irradiate the pattern with ultraviolet light in image capturing by the two-dimensional image sensor.

9. A method for detecting a defective nozzle in a liquid discharge head having at least one nozzle array including a plurality of nozzles lined in a nozzle array direction, the method comprising:
    dividing the plurality of nozzles into a plurality of nozzle units;
    forming a pattern including a plurality of unit patterns with the liquid discharged from the plurality of nozzle units, respectively, each of the plurality of unit patterns being smaller in size than an image capture range of a two-dimensional image sensor and including a number of columns of lines extending in a direction perpendicular to the nozzle array direction, the number of columns being not smaller than twice of a number of the at least one nozzle array;
    arranging the plurality of unit patterns in a staggered manner;
    capturing an image of each of the plurality of unit patterns with the two-dimensional image sensor;
    capturing an image of each of the plurality of unit patterns using the two-dimensional image sensor;
    obtaining red, green, and blue (RGB) data per unit pixel position of each of the plurality of unit patterns through capturing by the two-dimensional image sensor;
    detecting largest contrast data in the RGB data;
    using the largest contrast data to identify a position of each of the plurality of nozzles; and
    determining, based on the largest contrast data for each of the plurality of nozzles, whether each of the plurality of nozzles is defective.

10. A non-transitory recording medium storing a plurality of program codes which, when executed by one or more processors, causes the processors to perform a method for detecting a defective nozzle in a liquid discharge head having at least one nozzle array including a plurality of nozzles lined in a nozzle array direction, the method comprising:
    dividing the plurality of nozzles into a plurality of nozzle units;
    forming a pattern including a plurality of unit patterns with the liquid discharged from the plurality of nozzle units, respectively, each of the plurality of unit patterns being smaller in size than an image capture range of a two-dimensional image sensor and including a number of columns of lines extending in a direction perpendicular to the nozzle array direction, the number of columns being not smaller than twice of a number of the at least one nozzle array;
    arranging the plurality of unit patterns in a staggered manner;

capturing an image of each of the plurality of unit patterns with the two-dimensional image sensor;

capturing an image of each of the plurality of unit patterns using the two-dimensional image sensor;

obtaining red, green, and blue (RGB) data per unit pixel position of each of the plurality of unit patterns through capturing by the two-dimensional image sensor;

detecting largest contrast data in the RGB data;

using the largest contrast data to identify a position of each of the plurality of nozzles; and determining, based on the largest contrast data for each of the plurality of nozzles, whether each of the plurality of nozzles is defective.

11. The method according to claim 9, further comprising:

forming, with at least one of the plurality of nozzles, a mark for detecting at least three of four corners of each unit pattern.

12. The method according to claim 11, further comprising:

forming, as the mark, a frame defined by four lines surrounding each unit pattern.

13. The method according to claim 11, wherein:

a size of the mark includes a margin for a reading position error in the two-dimensional image sensor.

14. The method according to claim 11, further comprising:

correcting a magnification of the captured image by the two-dimensional image sensor using the mark on the captured image.

15. The method according to claim 11, further comprising:

removing noise and uneven illuminance from the RGB data of each of the plurality of unit patterns captured by the two-dimensional image sensor.

16. The non-transitory recording medium according to claim 10, further comprising:

forming, with at least one of the plurality of nozzles, a mark for detecting at least three of four corners of each unit pattern.

17. The non-transitory recording medium according to claim 16, further comprising:

forming, as the mark, a frame defined by four lines surrounding each unit pattern.

18. The non-transitory recording medium according to claim 16, wherein:

a size of the mark includes a margin for a reading position error in the two-dimensional image sensor.

19. The non-transitory recording medium according to claim 16, further comprising:

correcting a magnification of the captured image by the two-dimensional image sensor using the mark on the captured image.

20. The non-transitory recording medium according to claim 16, further comprising:

removing noise and uneven illuminance from the RGB data of each of the plurality of unit patterns captured by the two-dimensional image sensor.

* * * * *